United States Patent
Frank et al.

(10) Patent No.: US 11,947,071 B2
(45) Date of Patent: Apr. 2, 2024

(54) FAULT RADIATION BASED GRID COMPARTMENTALIZATION

(71) Applicant: Schlumberger Technology Corporation, Sugar Land, TX (US)

(72) Inventors: Milan Frank, Abingdon (GB); Fabrice Levassor, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 696 days.

(21) Appl. No.: 15/733,775

(22) PCT Filed: Apr. 18, 2019

(86) PCT No.: PCT/US2019/028028
§ 371 (c)(1),
(2) Date: Oct. 22, 2020

(87) PCT Pub. No.: WO2019/209609
PCT Pub. Date: Oct. 31, 2019

(65) Prior Publication Data
US 2021/0247543 A1    Aug. 12, 2021

Related U.S. Application Data

(60) Provisional application No. 62/661,070, filed on Apr. 22, 2018.

(51) Int. Cl.
*G01V 99/00* (2009.01)
*G01V 1/28* (2006.01)
(Continued)

(52) U.S. Cl.
CPC ............ *G01V 99/005* (2013.01); *G01V 1/282* (2013.01); *G06F 30/12* (2020.01); *G06Q 10/06* (2013.01);
(Continued)

(58) Field of Classification Search
CPC ................. G01V 99/005; G01V 1/282; G01V 2210/642; G06F 30/12; G06F 30/20;
(Continued)

(56) References Cited

U.S. PATENT DOCUMENTS

| 9,728,003 B1 | 8/2017 | Mallet et al. |
| 2012/0147704 A1 | 6/2012 | Xian et al. |

(Continued)

FOREIGN PATENT DOCUMENTS

| EP | 2631685 A2 * | 8/2013 | ........... G01V 99/005 |
| EP | 2631685 A2 | 8/2013 | |

(Continued)

OTHER PUBLICATIONS

Qu, Dongfang, Per Røe, and Jan Tveranger. "A method for generating volumetric fault zone grids for pillar gridded reservoir models." Computers & Geosciences 81 (2015). pp. 28-37. (Year: 2015).*

(Continued)

*Primary Examiner* — John E Johansen
(74) *Attorney, Agent, or Firm* — Jeffrey D. Frantz

(57) ABSTRACT

A method can include accessing a model of a subterranean region where the model includes a fault that corresponds to a fault in the subterranean region; via a first side of the fault, outwardly radiating therefrom cells of the model with a first type of radiation and, via a second, opposing side of the fault, outwardly radiating therefrom cells of the model with a second type of radiation; and, based at least in part on the outwardly radiating of the first type of radiation and the outwardly radiating of the second type of radiation, assigning a portion of the cells of the model a sidedness property value with respect to the fault that indicates that each cell in the portion of the cells is assigned to the first side of the fault or assigned to the second side of the fault.

20 Claims, 14 Drawing Sheets

(51) Int. Cl.
*G06F 30/12* (2020.01)
*G06Q 10/06* (2023.01)
*G06Q 50/02* (2012.01)
*G06T 19/20* (2011.01)
*G06F 30/20* (2020.01)
*G06F 111/10* (2020.01)

(52) U.S. Cl.
CPC .............. *G06Q 50/02* (2013.01); *G06T 19/20* (2013.01); *G01V 2210/642* (2013.01); *G06F 30/20* (2020.01); *G06F 2111/10* (2020.01); *G06T 2219/2012* (2013.01)

(58) Field of Classification Search
CPC .... G06F 2111/10; G06Q 10/06; G06Q 50/02; G06T 19/20; G06T 2219/2012
USPC ........................................................... 703/10
See application file for complete search history.

(56) References Cited

U.S. PATENT DOCUMENTS

| | | |
|---|---|---|
| 2012/0232859 A1 | 9/2012 | Pomerantz et al. |
| 2016/0252648 A1 | 9/2016 | Omeragic et al. |
| 2016/0350263 A1 | 12/2016 | Shi et al. |

FOREIGN PATENT DOCUMENTS

| | | | |
|---|---|---|---|
| WO | 2015080699 A1 | 6/2015 | |
| WO | WO-2015080699 A1 * | 6/2015 | .......... G01V 99/005 |
| WO | 2018063195 A1 | 4/2018 | |
| WO | 2018069744 A1 | 4/2018 | |

OTHER PUBLICATIONS

Hoffman, Karen S., John W. Neave, and Erk H. Nilsen. "Application of the fused fault block method in structural modeling and reservoir gridding of complex structures." 2006 SEG Annual Meeting. OnePetro, 2006. pp. 1-5. (Year: 2006).*
Lie, K-A., et al. "A general non-uniform coarsening and upscaling framework for reduced-order modeling." SPE Reservoir Simulation Conference. OnePetro, 2017. pp. 1-17. (Year: 2017).*
International Search Report and Written Opinion dated Aug. 14, 2019 in International Application No. PCT/US2019/028028, 7 pages.
European Search Report issued in European Patent Application No. 19792664.5 dated Dec. 23, 2021, 8 pages.
International Preliminary Report on Patentability dated Oct. 27, 2020 for equivalent patent PCT/US2019/028028.
First Office Action issued in Chinese Patent Application No. 201980040259X dated Sep. 9, 2023, 25 pages with partial English translation.
Qu, D. et al., "A method for generating volumetric fault zone grids for pillar gridded reservoir models", Computers and Geosciences, 2015, pp. 28-37.

\* cited by examiner

710

730

GRID, EDIT Sections

PROPS, REGIONS, SOLUTION Sections

SCHEDULE Section

Method 1210

1220
Calculate Pore Volumes, Transmissibilities, Depths and NNCs.

1240
Initialize, calculate initial saturations, pressures and fluids in place

1260
Define wells and surface facilities. Advance through time by material balance for ind. cells with wells as sinks or sources

FAULT RADIATION BASED GRID COMPARTMENTALIZATION

CROSS-REFERENCE TO RELATED APPLICATION

This application claims priority to and the benefit of a U.S. Provisional Application having Ser. No. 62/661,070, filed 22 Apr. 2018, which is incorporated by reference herein.

BACKGROUND

Phenomena associated with a sedimentary basin may be modeled using various equations of a simulator that is a machine, which may be a distributed machine. For application of a numerical technique, such equations may be discretized using a grid that includes nodes, cells, etc. Where a basin includes various types of features (e.g., stratigraphic layers, faults, etc.), nodes, cells, etc., of a grid may represent, or be assigned to, such features. In turn, discretized equations may better represent the basin and its features.

SUMMARY

A method can include accessing a model of a subterranean region where the model includes a fault that corresponds to a fault in the subterranean region; via a first side of the fault, outwardly radiating therefrom cells of the model with a first type of radiation and, via a second, opposing side of the fault, outwardly radiating therefrom cells of the model with a second type of radiation; and, based at least in part on the outwardly radiating of the first type of radiation and the outwardly radiating of the second type of radiation, assigning a portion of the cells of the model a sidedness property value with respect to the fault that indicates that each cell in the portion of the cells is assigned to the first side of the fault or assigned to the second side of the fault. A system can include a processor; memory operatively coupled to the processor; and processor-executable instructions stored in the memory to instruct the system to: access a model of a subterranean region where the model includes a fault that corresponds to a fault in the subterranean region; via a first side of the fault, outwardly radiate therefrom cells of the model with a first type of radiation and, via a second, opposing side of the fault, outwardly radiate therefrom cells of the model with a second type of radiation; and, based at least in part on the outwardly radiation of the first type of radiation and the outwardly radiation of the second type of radiation, assign a portion of the cells of the model a sidedness property value with respect to the fault that indicates that each cell in the portion of the cells is assigned to the first side of the fault or assigned to the second side of the fault. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
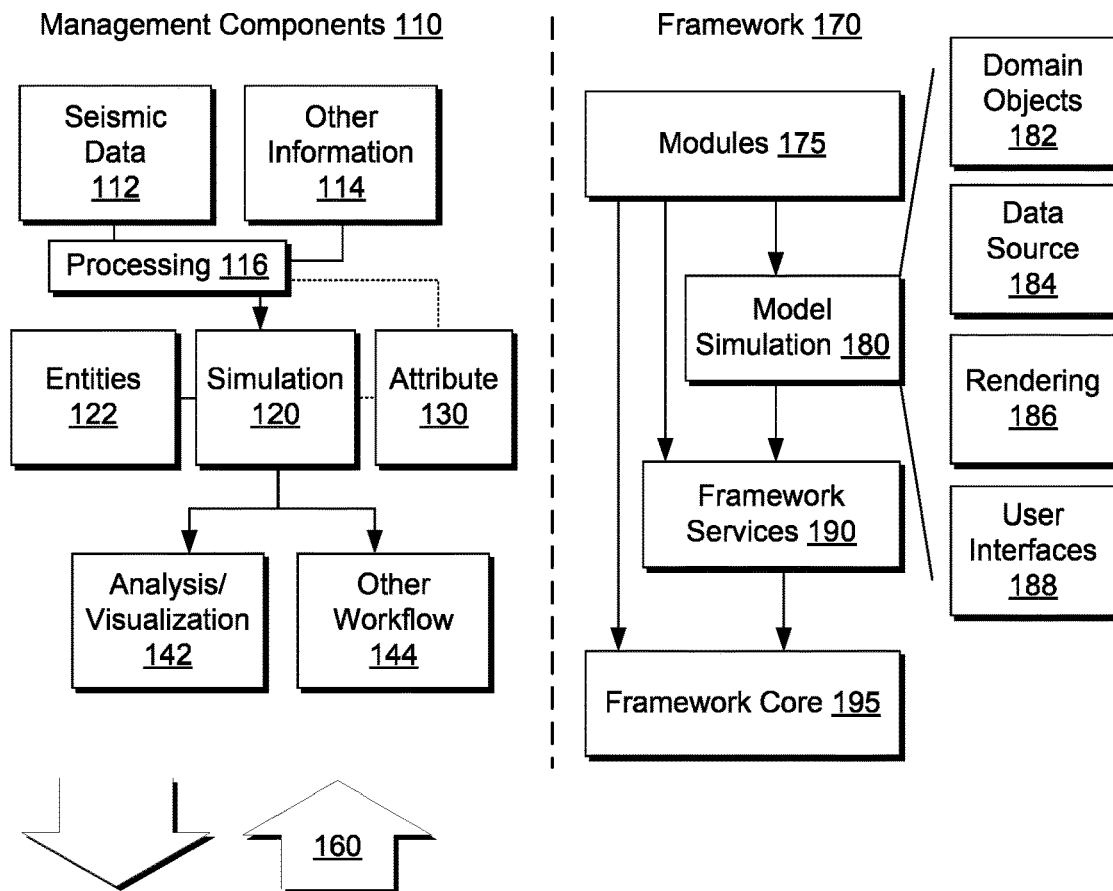
FIG. 1 illustrates an example system that includes various components for modeling a geologic environment and various equipment associated with the geologic environment.
Figure 1:
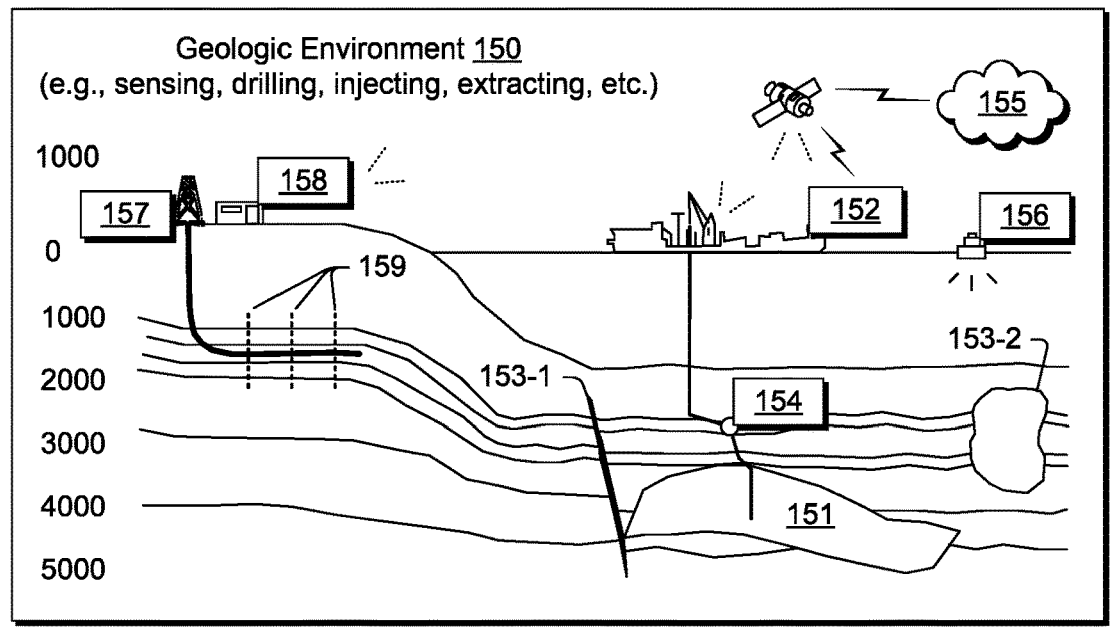

This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using various equations (e.g., stress, fluid flow, phase, etc.). As an example, a numerical model of a basin may find use for understanding various processes related to exploration and production of natural resources (estimating reserves in place, drilling wells, forecasting production, etc.).

For application of a numerical technique, equations may be discretized using a grid that includes nodes, cells, etc. For example, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multi-dimensional "elements". For one spatial dimension, an element may be represented by two nodes positioned along a spatial coordinate. For multiple spatial dimensions, an element may include any number of nodes. Further, some equations may be represented by the total number of nodes while others are represented by fewer than the total number of nodes (e.g., consider an example for the Navier-Stokes equations where fewer than the total number of nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As an example, a finite volume flow simulator may simulate phenomena using a grid where grid cells defined by the grid may include 6 faces (e.g., cuboid) addressable through three indices (e.g., such that the grid may be deemed a "structured" grid) and that geometry of the grid abides by one or more conditions (e.g., cells do not cross geologic faults and cells do not cross geologic horizons). As an example, in an effort to meet a geologic fault condition, a grid may be offset across one or more geologic faults. Construction of such a grid in a domain where topology of a fault network is complex (e.g., numerous X and Y-shaped intersections) may be non-trivial and demand resources that scale nonlinearly with increasing fault network complexity.

As an example, an approach to modeling of a sedimentary basin can include a pillar grid composed of nodes, pillars and cells. For example, in three-dimensions, eight nodes may define a cell, which may be referred to as a grid cell (e.g., a pillar grid cell). In a pillar grid model, grid cells may be indexed in an indexical domain using indexes i, j, and k (e.g., an indexical coordinate system or space, which may be represented as I, J, and K or other characters, symbols, etc.). For example, a cubic grid cell (i.e., defined by eight corner nodes) may be indexed at its shallowest lower left corner and the number of grid cells may be a product of the model's i, j and k dimensions. In such an example, each grid cell may be defined by its eight nodes, which may be labeled according to height and compass directions (e.g., basesouthwest, topsouthwest, basenorthwest, topnorthwest, etc.). Pillar grids can model, for example, faults (e.g., a surface that cuts a pillar grid), horizons (e.g., "k" index), zones (e.g., volume between two horizons), segments (e.g., contiguous block of grid cells bounded by fault planes), etc., and may be used to specify properties (e.g., earth properties).

While an indexical coordinate system is described with respect to a pillar grid, an indexical coordinate system may be used in conjunction with other types of grids. For example, a grid that can define cells may be characterized using indexes such as i, j, and k to represent three spatial dimensions. Such indexes may be capable of representing a grid, for example, in a so-called structured manner (e.g., in contrast to an unstructured manner). As an example, a structured grid may facilitate various types of operations such as those related to matrices, for example, where nearest neighbors may form clusters or bands within a matrix. In turn, a matrix may be handled using a banded solver or other suitable technique. As to a solver for an unstructured grid, as an example, it may rely on input of connectivity information that specifies how grid nodes relate to individual cells. In such an example, a matrix that may not be readily amenable to a banded or other matrix handling technique, which, in turn, can increase computational resource demands, computation time, etc.

As an example, a structured grid that includes a natural (i, j, k or I, J, K) indexing system can improve storage and, for example, facilitate identification of topological neighbors where cell index and connectivity might not be stored in memory and can be deduced from ordering of records/entries in memory. In such an example, storing a structured grid can use less memory than, for example, storing an unstructured grid of similar size. Further, as an example, for construction of large systems of equations (e.g., independently from their resolution), which may involve repeatedly iterating over topological neighbors of a given grid cell, such an approach may be, for example, about an order of magnitude faster when compared to use of an unstructured grid. As an example, a method that can generate a structured grid may provide compatibility with one or more frameworks (e.g., whether current, legacy, etc.).

As mentioned, where a sedimentary basin (e.g., subsurface region) includes various types of features (e.g., stratigraphic layers, faults, etc.), nodes, cells, etc. of a grid may represent, or be assigned to, such features. In turn, discretized equations may better represent the sedimentary basin and its features. As an example, a structured grid that can represent a sedimentary basin and its features, when compared to an unstructured grid, may allow for more simulations runs, more model complexity, less computational resource demands, less computation time, etc.

As an example, a grid may conform to structural features such as, for example, Y-faults, X-faults, low-angle unconformities, salt bodies, intrusions, etc. (e.g., geological discontinuities), to more fully capture complexity of a geological model. As an example, a grid may optionally conform to stratigraphy (e.g., in addition to one or more geological discontinuities). As to geological discontinuities, these may include model discontinuities such as one or more model boundaries. As an example, a grid may be populated with property fields generated, for example, by geostatistical methods.

As an example, a discontinuity may be discerned via seismology where, for example, a subsurface boundary or interface exists at which a physical quantity, such as the velocity of transmission of seismic waves, changes abruptly. For example, the velocity of P-waves increases from about 6.5 km/s to about 8 km/s at the Mohorovicic discontinuity between the Earth's crust and mantle.

Seismology can include seismic tomography, which may be a form of tomographic scanning. For example, sources and receivers may be utilized according to a survey geometry (e.g., acquisition geometry) for a subterranean region (e.g., via land and/or marine equipment) to acquire data where sources emit seismic energy and where receivers receive at least a portion of the emitted seismic energy. In such an example, with a priori knowledge of the survey geometry, based at least in part on receipt of the receiver data, one or more reconstruction techniques can be implemented by a computing device or computing system to spatially characterize a subterranean region, for example, by outputting a model that includes values that depend on material properties, structures, etc., of the subterranean region. As an example, a model may be an image rendered as pixels to a display or, for example, a model may be values rendered to a display with spatial information or, for example, a model may be a grid-based (e.g., cell-based) model of at least a portion of the subterranean region where the grid (e.g., or cells) are spatially representative of the subterranean region at a point in time or otherwise structurally (e.g., layer-cake, etc.). Such a computing device or computing system can be part of a distributed "machine" that is a seismic tomographic scanner. A seismic tomographic scanner receives seismic data and generates a model based at least in part on the seismic data to provide an understanding of the object being scanned (i.e., the Earth). As an example, seismic energy may be generated by an indirect process such as pumping fluid into the Earth (e.g., via a well) such that fracturing of the Earth occurs where such fracturing involves seismic emissions (e.g., microseismic emissions). Seismic tomographic scanning can include receiving microseismic emissions generated via hydraulic fracturing of the Earth and, for example, processing such emissions (e.g., seismic data) to output information as to one or more fractures (e.g., spatial location(s) of one or more fractures).

Seismic interpretation is a process that involves examining seismic data (e.g., with respect to location and time or depth) to identify one or more types of subsurface structures (e.g., horizons, faults, geobodies, etc.). An interpretation process may consider vertical seismic sections, inline and crossline directions, horizontal seismic sections called horizontal time slices, etc. Seismic data may optionally be interpreted with other data such as, for example, well log data.

As an example, seismic interpretation may be performed using seismic to simulation software such as the PETREL® seismic to simulation software framework (Schlumberger Limited, Houston, Tex.), which includes various features, for example, to perform attribute analyses (e.g., with respect to a 3D seismic cube, a 2D seismic line, etc.), to analyze other data, to build models, etc. While the PETREL® seismic to simulation software framework is mentioned, other types of software, frameworks, etc., may be employed.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston Tex.), the INTERSECT® reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment such as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.). In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN® framework where the model simulation layer 180 is the PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a set of instructions such as a plug-in (e.g., external executable code, etc.).

Figure 2:
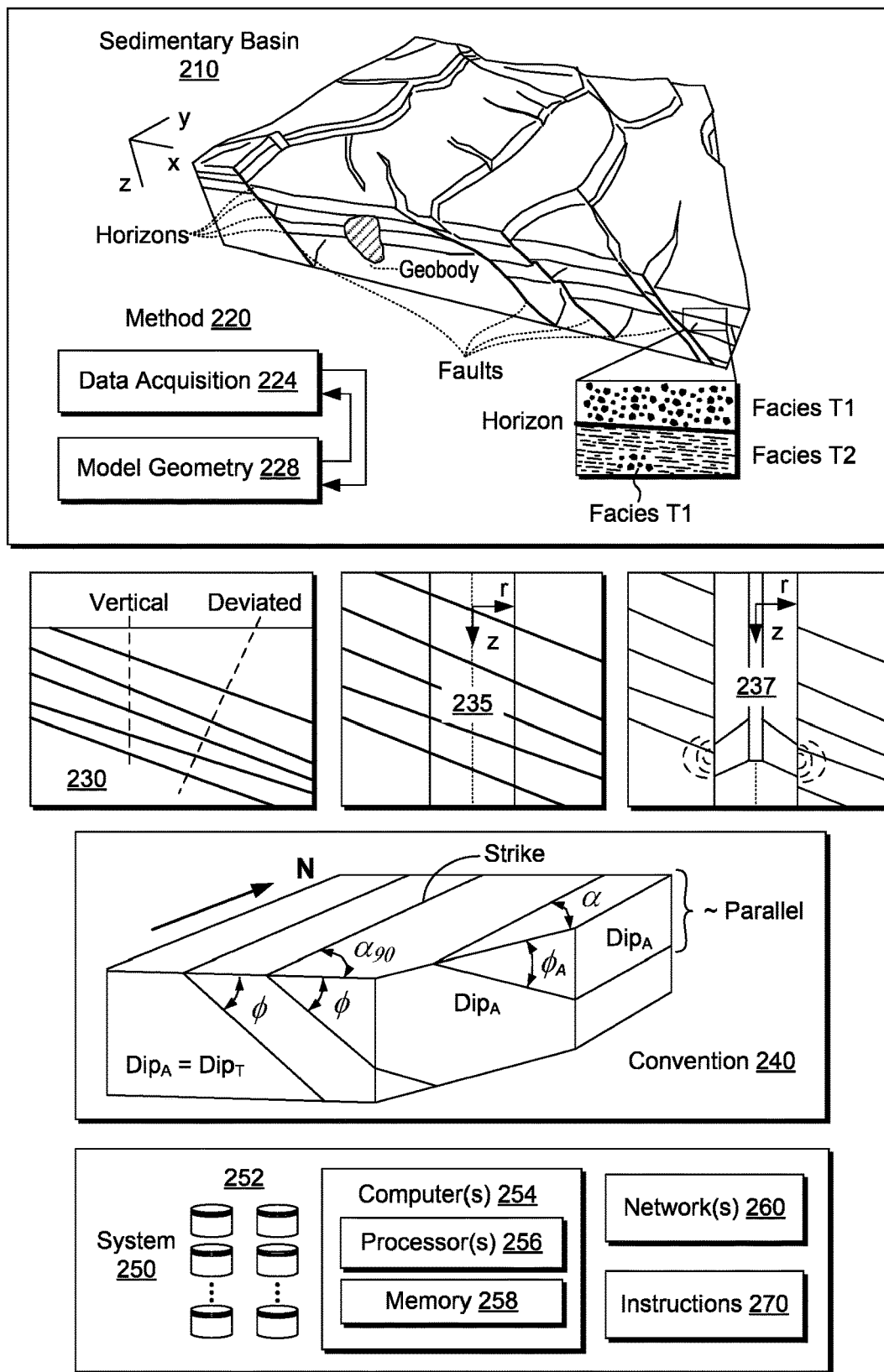
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework such as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions, for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in memory) executable by one or more processors to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

Figure 3:
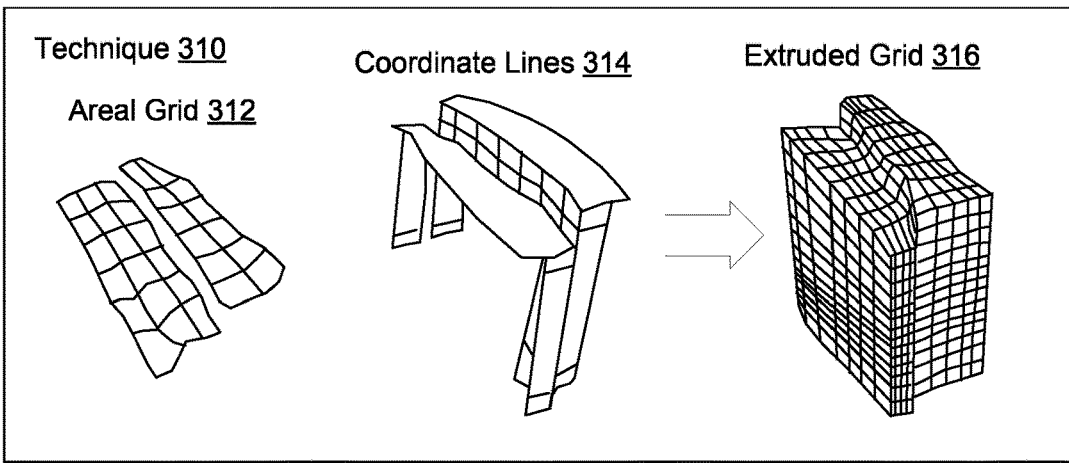
FIG. 3 illustrates examples of techniques, an example of a stairstepped grid and an example of a stairstepped representation of a fault.
Figure 3:
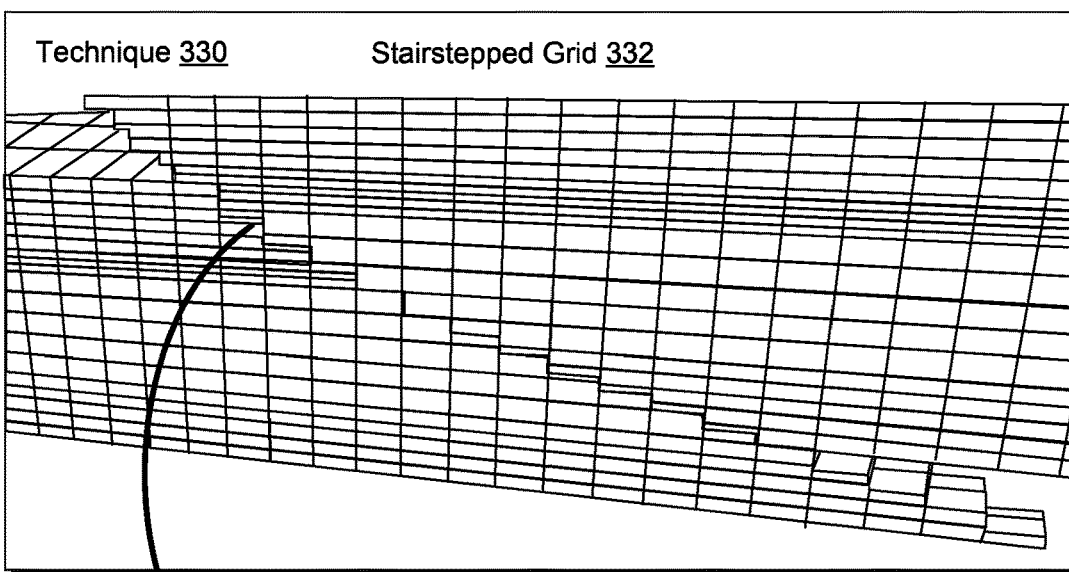
Figure 3:
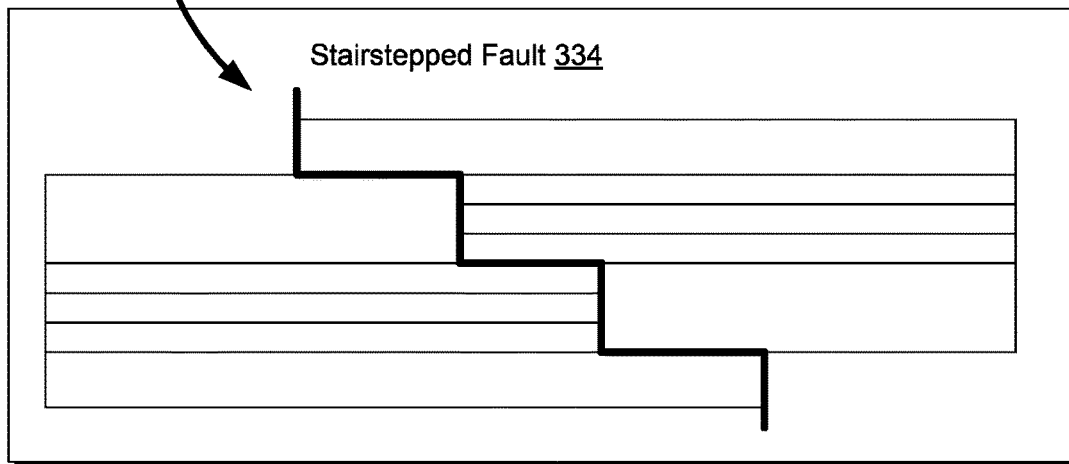

FIG. 3 shows examples of techniques for handling faults. In particular, a technique 310 and/or a technique 330 can be used for creating faulted structured grids that aim to conform to geological horizons.

As to the technique 310, it is based on the extrusion of a surface grid. For example, a topological areal grid 312 conforming to and cut by a fault of a fault network is built and some coordinate lines 314 are provided. Given the grid 312 and the coordinate lines 314, a 3D grid 316 is created by an extrusion process that may include duplicating multiple times the base grid and adapting it to the horizon geometry, along linear or curved coordinate lines which trajectory is computed in such a way it does not cross the fault network.

The technique 310 can give rise to some issues, for example, it may not be possible to design coordinate lines that run from the base to the top of the grid without crossing any fault and it may not allow efficient minimization of distortion of grid cells (e.g., distortion being defined as a measure of the distance to purely orthogonal geometries).

As to the technique 330, it includes creating first a 3D (e.g., unfaulted) grid that conforms to horizon surfaces and then, for example, rasterizing faults within the grid. In such an example, the action of rasterizing can corresponds to finding the set of cell facets that correspond the best to the fault surfaces and "unsewing" (e.g., unstitching) the grid along these facets. Such a rasterization process involves computing a set of edges of a topological dual of the grid that are intersected by an object(s) to be rasterized, which, in the example of FIG. 3, is a fault, as shown in a side view of a 3D grid 332 and in an enlarged simplified side view 334.

The technique 330 can give rise to some issues. For example, the grid facets representing the faults may poorly approximate the geometry of the initial fault surfaces. And, such a rasterization operation may involve creating a stairstepped (or zig-zag) representation of the fault surfaces (see, e.g., 334). Consequences of stairstepped geometry may be germane to petrophysical properties—potentially affecting flow simulations—as may be associated with fault surfaces (e.g., such as those related to fault permeability) and to situations where wells are crossing faults because location of the intersections with the faults are represented with some level of inaccuracy.

Rasterization, as applied to a grid, may subject grid geometry to one or more constraints. For example, consider a desire to maintain matching stairsteps on both sides of a fault (e.g., to avoid gaps, overlaps, etc.) and another desire to maintain layering of a grid that follows geological surfaces (e.g., per seismic or well data). As fault displacement may create an offset between both sides of the fault that does not correspond to an integer number of cells in a vertical direction of a grid (e.g., k index, time, or depth), distortions may occur in the neighborhood of a fault (e.g., by stretching, squeezing or merging grid cells vertically, moving horizons artificially, or both).

Figure 4:
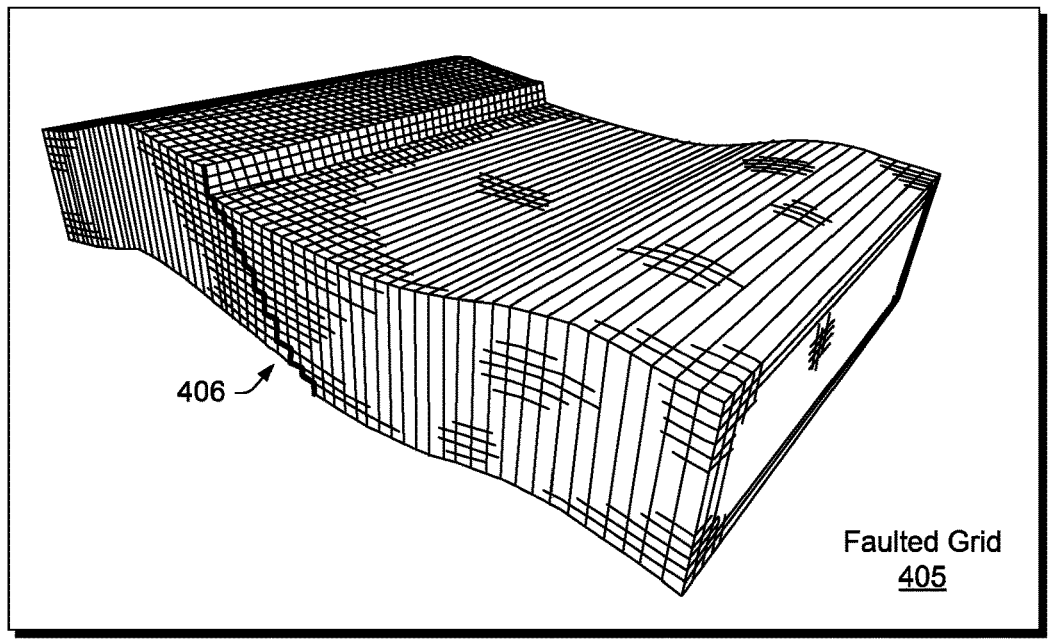
FIG. 4 illustrates an example of a geologic model and an example of a portion of the model.
Figure 4:
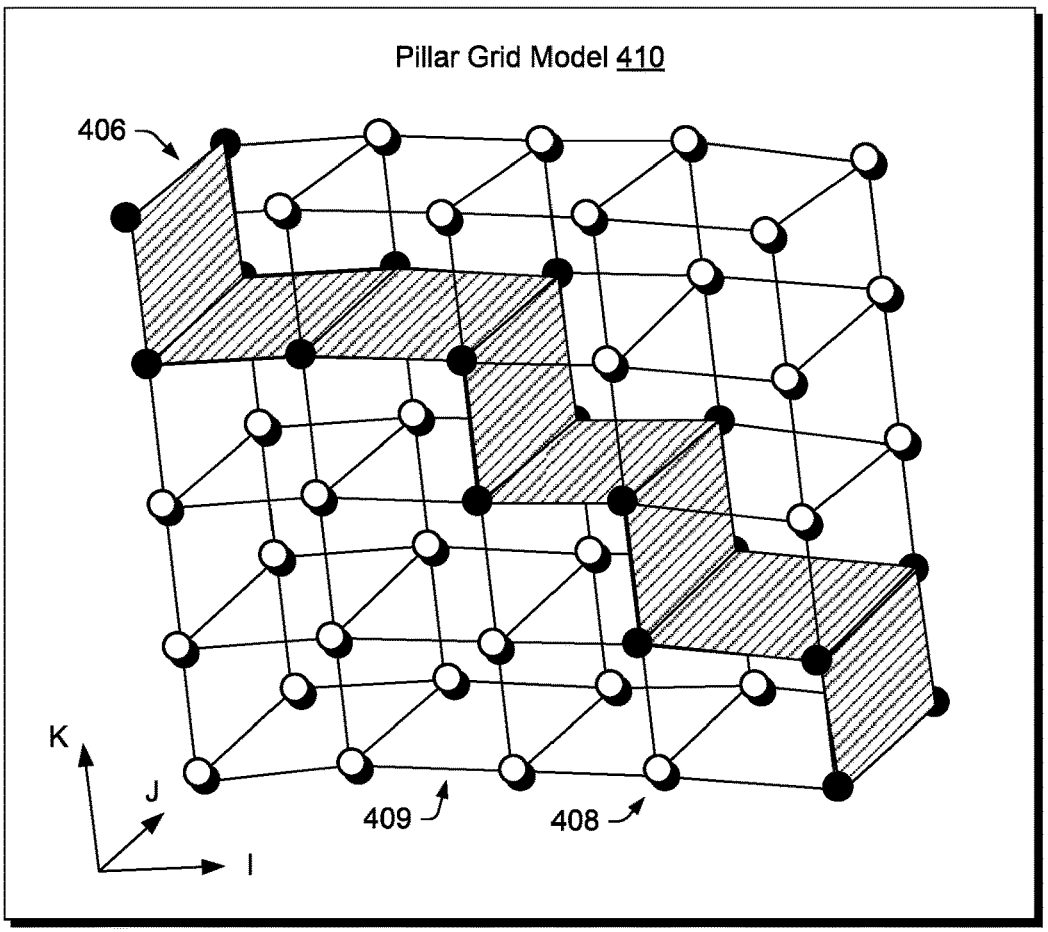

FIG. 4 shows an example of a faulted grid 405 that includes a stairstepped portion that represents a fault 406 in a geologic environment. FIG. 4 also shows an example of a portion of a pillar grid model 410 that includes nodes 408 and connections 409 where connections along the K index of an I, J, K index reference system can correspond to pillars. As shown, the pillar grid model 410 includes a stairstepped representation of the fault 406; whereas, in an actual geologic environment, a fault is unlikely to be spatially stairstepped in a manner that corresponds to a pillar grid, particularly given resolution of a pillar grid. As an example, the pillar grid model 410 may provide for representations of horizons where one or more horizons may be shifted in part in a direction of the K index such that on one side of the stairstepped representation of the fault 406, a horizon has a first K index and on the other side of the stairstepped representation of the fault 406, the same horizon has a second, different K index. In other words, faulting may a shift horizon such that a horizon is discontinuous across a fault.

Figure 5:
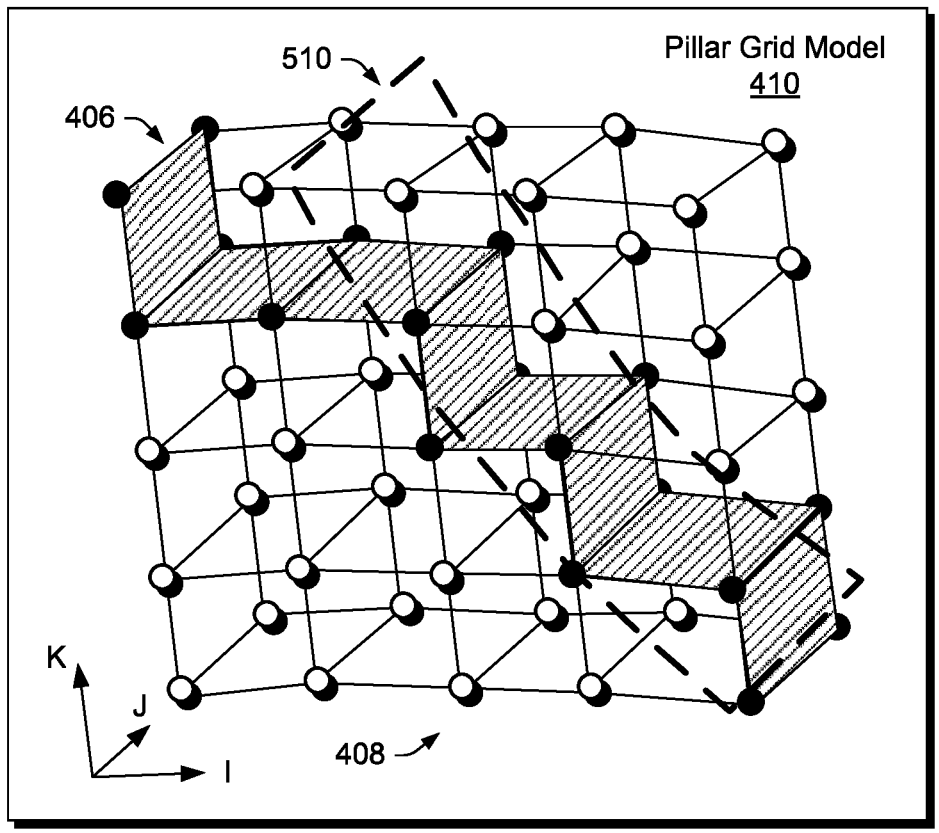
FIG. 5 illustrates an example of a grid model with respect to a surface and an example of a projection technique.

FIG. 5 shows the pillar grid model 410 of FIG. 4 as including a fault surface 510, which may be a physically more accurate representation (e.g., more realistic) when compared to the stairstepped representation of the fault 406. Or, in other words, the stairstepped representation of the fault 406 may be an approximation of the fault surface 510 in a discretized space defined by orthogonal coordinates (e.g., I, J and K index direction). As an example, a fault may be planar and may dip at an angle that is offset from one or more of the indexes I, J and K. As such, a fault may not be positioned or aligned with one or more coordinate system directions, again, which can be a reason for approximating a fault via stairstepping.

Stairstepping can be employed to maintain grid characteristics. For example, it may be desirable to maintain grid cell shapes for purposes of computations such as, for example, to aid in one or more of numerical stability in iterative solution techniques, array handling, etc. As an example, stairstepping may be employed to facilitate use of indexing such as, for example, the I, J and K indexing shown in FIG. 5, which may carry over to arrays in a numerical solver that solves systems of equations defined spatially with respect to a pillar grid model. However, as a fault in nature may differ spatially from a stairstepped representation thereof in a pillar grid model, a system of equations when solved for a stairstepped representation of a fault may provide a solution (e.g., as to pressure, flow, etc.) that does not adequately match natural phenomena, particularly near a fault (e.g., or other discontinuity).

Figure 6:
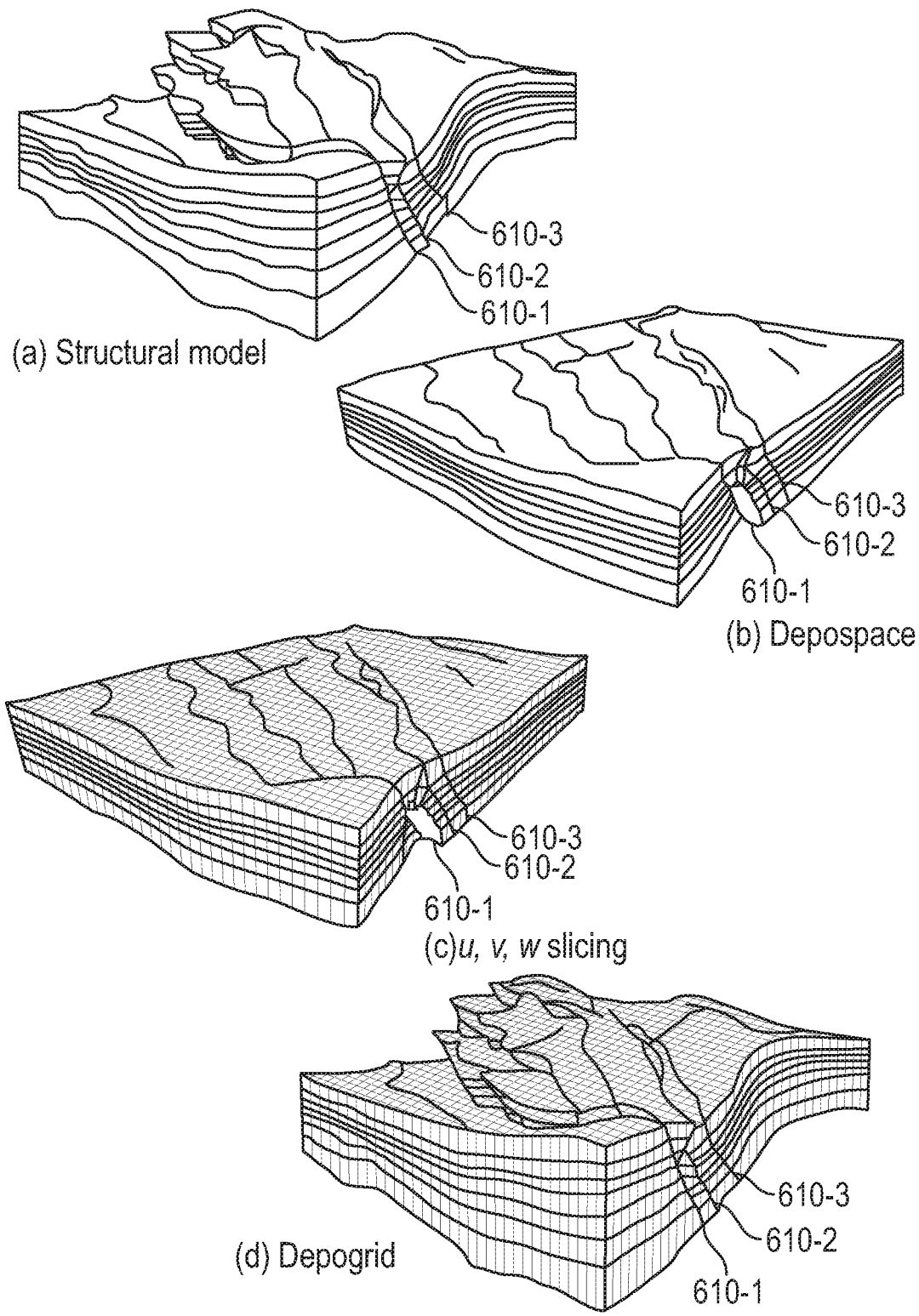
FIG. 6 illustrates examples of representations of a subterranean environment.

FIG. 6 shows various structural model representations of a geologic environment. Such models are based at least in part on data acquired using one or more types of sensors (e.g., seismic tomographic sensors, etc.). Various subterranean features are not visible to the human eye and therefore instruments are utilized to explore, measure, sense, etc., subterranean materials (e.g., rock, fluid, etc.).

A three-dimensional stereoscopic film (also known as three-dimensional film, 3D film or S3D film) is a motion picture that enhances the illusion of depth perception, hence adding a third dimension. A common approach to the production of 3D films is derived from stereoscopic photography. In such an approach, a regular motion picture camera system is used to record the images as seen from two perspectives (e.g., or computer-generated imagery generates the two perspectives in post-production), and special projection hardware and/or eyewear are used to limit the visibility of each image to the viewer's left or right eye.

Rather than regular motion picture camera systems, which generate light image data (e.g., pixels, color model data, etc.), exploration of a subterranean region utilizes different types of data as can be acquired via tools such as downhole tools that can be positioned in a borehole and/or surface tools (e.g., land, marine, etc.) that can emit and/or acquire seismic energy (e.g., reflection seismology, etc.). In 3D film and in exploration of the Earth, ultimately a model is generated that allows for enhanced visualization or, as to the Earth, one or more types of other processing that can help to inform decision making, field operations (e.g., drilling, fracturing, etc.), etc.

In FIG. 6, the various models provide a description of the creation of a depogrid (e.g., a type of model) from a structural model. The structural model (a) in geological space is transformed (e.g., one-to-one and invertible mapping) to a depositional space (depospace; (b)) in which conformable horizons are horizontal planes. The depospace is represented by an orthogonal coordinate system (u, v, w), with the vertical coordinate w defining a geological time parameter. The structural model in depospace can be sliced uniformly in the u and v directions, and each zone is divided by a specified number of planes in the w direction (c). Faults can be represented precisely as cut cells of this grid in depositional space. The inverse mapping applied to the grid (c) in depospace recovers the depogrid in geological space (d). The cut cells are independently transformed to geological space to accurately represent the original fault framework model. For example, compare the depogrid (d) to the structural model (a).

In the example of FIG. 6, three faults are labeled 610-1, 610-2 and 610-3. As seen in the structural model (a), the layers between the fault 610-1 and the fault 610-2 are shifted such that at least some of the layers on opposing sides of the fault 610-1 do not align at their upper and lower horizons and such that at least some of the layers on opposing sides of the fault 610-2 do not align at their upper and lower horizons. In the depospace (b), alignment is shown, as well as in the sliced spaces of the grid (c); whereas, in the depogrid (d), the shifts are represented as in the structural model (a). As mentioned, faults can be represented precisely as cut cells of the grid in depositional space (e.g., depogrid). In such an example, a fault can be a divider such that, for example, the depogrid includes cells to one side of the fault and other cells to another, opposing side of the fault. In such an example, each of the cells can be assigned properties that represent properties of a subterranean region. Such properties can be or include material properties where material may be categorized by lithology (e.g., macroscopic nature of the mineral content, grain size, texture, color, etc., of material(s)).

As an example, a method can include generating compartments for volumetric cellular grids with faults. Compartmentalization can be an input into reservoir modelling workflow, an engineering workflow, or other workflow. Compartmentalization can include assigning properties in different parts of a reservoir as modeled by a grid. For example, consider a method that includes defining gas-oil and oil-water contact and fluid properties across geological boundaries for estimation of volume of reserve and/or prediction of production. In such an example, a simulator can provide for reservoir modeling subject to one or more conditions, which may include one or more conditions associated with one or more field operations. For example, consider injection as a field operation (e.g., injection of fluid via a well or wells), consider production as a field operation (e.g., production of fluid via a well or wells), consider fracturing as a field operation, etc. In various field operations boundaries between gas-oil and/or oil-water may move spatially within a reservoir, for example, responsive to one or more of injection and production of fluid. At one level, production of fluid from a reservoir may be viewed as a problem of how to optimally produce the fluid (e.g., remove the fluid from the reservoir). Such a problem is highly complex and, if performed inappropriately, may confound further production (e.g., cause re-evaluation of production plans, techniques, etc.).

As an example, compartmentalization can include specifying that two cells that are on opposing sides of a fault of interest are assigned a different compartment number (e.g., while keeping the number of compartments at the lowest possible minimum). Such compartmentalization can be a complex technological problem, especially as it may be expected, that some fault portion "extends" beyond its actual physical span.

In the modelling of the subsurface within an exploration and production framework, structured grids may be generated at varying scales that are suitable for geological modelling, simulation, planning of field operations, execution of field operations, control of field operations, etc.

The generation and use of structured grids provides some particular benefits at different stages of the modelling and simulation end-to-end workflow, where a system may make use of the logical (I, J, K) neighboring of cells to infer relationships when modelling grid properties and the along- and through-layer cell directions. The latter benefit may be employed in reservoir simulation to simplify the cell-cell transmissibility calculations; however, such simplification introduces errors as the grid cells become less cuboid in nature (e.g., as internal angles deviate from 90 degrees).

As mentioned with respect to FIG. 4 and FIG. 5, one approach to producing structured grids is 'pillar gridding', in which faults can be smooth surfaces and the grid has a specified number of cells in the three grid directions. Such gridding approaches require simplification of the faults in complex geological settings (e.g. when faults converge vertically; 'Y' or 'X' faults), and can lead to both substantial cell distortions and a large range in grid cell sizes, the latter issue being problematic for grid property modelling.

A stairstep grid is a type of structured grid that tends to be quite suitable for reservoir simulation applications. The sides of the grid cells and the K coordinate lines are vertical, and the grid layer geometry is identified by corner points down these 'pillars'. Whilst stairstep grids allow for more complex geological settings to be modelled, the faults are stairstepped through the grid both laterally and vertically, and this can reduce the accuracy of geological reservoir modelling. Some approaches to handle such accuracy may define split cells (in geological space) at the fault location that aim to accurately represent the fault surface and the fault-horizon geometries.

Grids that lack the neat coordinates and numbering conventions of structured can be referred to as unstructured grids. The input data to the modelling process allows a volumetric model to be created in geological space, before being transformed geomechanically into a depositional space in which the conformable horizons are horizontal planes and the fault offsets have been removed. Gridding can occur in the depositional space where faults can be accurately represented using cut cells in the depositional space. The application of the inverse transformation to the grid in depositional space leads to a grid in geological space (the depogrid) that can more accurately represent an original volumetric model while honoring stratigraphy. The accurate modelling of depositional properties of this unstructured depogrid in geological space relies on knowledge of the depositional directions in which the grid properties, in particular directional properties such as permeability, were assumed to originate. The following workflow involves using the depositional mapping to both analyze a depogrid and to more accurately model and simulate directional properties:

Generation of the structural model, depospace transform, grid in depositional space, and depogrid in geological space;

Use of the depositional-geological space mapping to estimate local axes for depogrid cells;

Analysis of the local axis orientations and dimensions for each grid cell in geological space to understand the potential local grid errors arising from errors in the input data; and Orthonormalisation of the grid axes and representation of directional properties in depogrids for consumption by reservoir simulators.

As described above, the modelling and simulation of the subsurface in various frameworks tends to employ structured grids. Such grids include approximations at different stages of an end-to-end workflow.

As mentioned, an alternative to a structured grid may be an unstructured grid. As an example, consider unstructured depogrids and benefits of accurate modelling of geological inputs and more accurate simulation of such depogrids, for example, by refraining from or reducing the amount of simplifications made when using structured grids.

The conceptual generation of a depogrid is illustrated in FIG. 6 using an initial structural model, a transformation of this geological model to depositional space (depospace), the division of this model in depospace according to the (orthogonal) u, v and w directions, and the final transformation back to geological space to define the faulted depogrid. The transformation to depositional space may define a one-to-one mapping between points in the structural model (geological space) and points in the corresponding model in depospace. The depogrid faults and horizons can accurately match those of the original structural model, while the additional grid layers between the seismic horizons honor the stratigraphic nature of the depositional mapping. When viewed in the geological space, the w coordinate lines retain their orthogonal relationship with the local seismic horizons as enforced in depositional space.

As to a one-to-one mapping, it can be that a point located exactly on a fault surface of the structural model in geological space will correspond to two (or more at fault-fault intersections) points in depospace, as the point will be separately considered to lie on each of the two sides of that fault. Each point on the fault surface can therefore be represented by several collocated points that have unique depospace locations.

Figure 7:
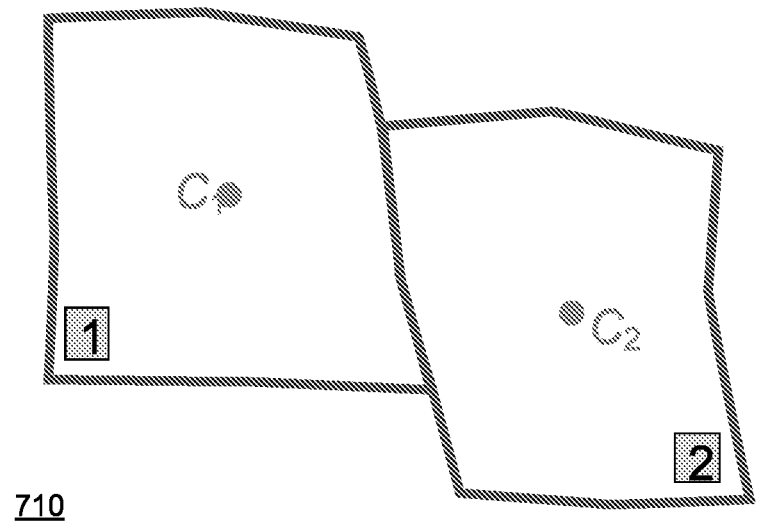
FIG. 7 illustrates examples of methods.
Figure 7:
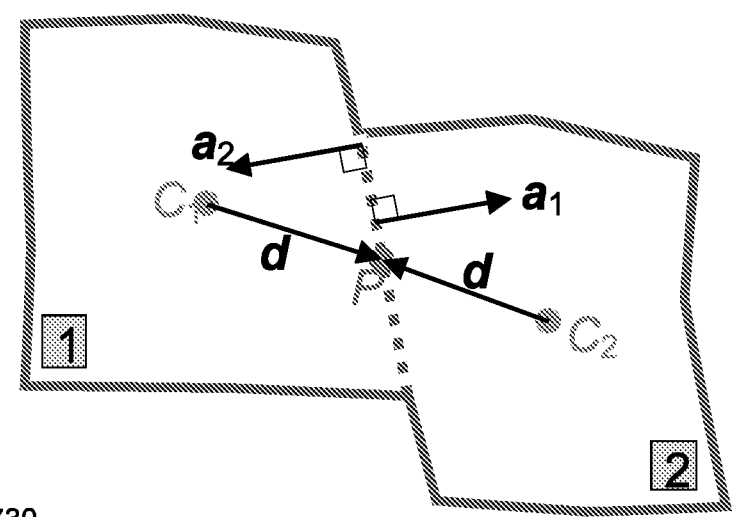

FIG. 7 shows examples of graphics 710 and 730 of two adjacent cells in an unstructured depogrid that can potentially meet at multiple common cell faces. At faults and unconformities (e.g., as well as for two cells not at faults or unconformities) such matching of faces may be guaranteed.

As an example, a method can include compartmentalizing as to properties of a grid that is a model of a subterranean region that is based at least in part on seismic data, for example, as acquired by a distributed assembly of acquisition equipment that includes seismic energy emitters (e.g., sources) and seismic energy receivers (e.g., sensors). Such a method can include operating a simulator that, based at least in part on compartmentalizing, generates results for one or more types of physical phenomena that can occur in a subterranean region. As an example, a simulator may be part of a computational system that includes an interface that can issue a signal to one or more pieces of field equipment to instruct the field equipment to perform an action in the field, which may effectuate a result as indicated by the simulator or that may otherwise be based at least in part on physical phenomena indicated by the simulator.

As an example, a method can include assigning individual cells of a grid of cells to one of two categories such as, for example, either a hangingwall side or a footwall side (e.g., a "plus" side or a "minus" side) of a fault of interest represented in the grid of cells (e.g., the grid). Such assigning can be stored to a storage device as a side property (e.g., a property that corresponds to a side of a fault). Such a method can include combining side properties into a single compartment property while honoring a given fault truncation rule or rules.

As an example, a method can include implementing a technique that decides the side of a fault to which a cell belongs. As an example, a method may utilize a radiation source approach where radiation can be artificially imposed within a grid to illuminate cells of a grid. In such a technique, illumination values may be generated for individual cells. In such an example, illumination values can differ depending on side of fault of a cell. For example, consider illumination that is red for one side of a fault and blue for another side of a fault; noting that various other representations may be utilized to distinguish one side's illumination from another side's illumination (e.g., via a different color or another type of scale). As an example, an intensity value may be utilized. For example, consider a red intensity ranging from 0 to 255 (e.g., with a particular bit depth, etc.) and consider a blue intensity ranging from 0 to 255 (e.g., with a particular bit depth, etc.). In such an example, the values may be rendered to a display.

Figure 8:
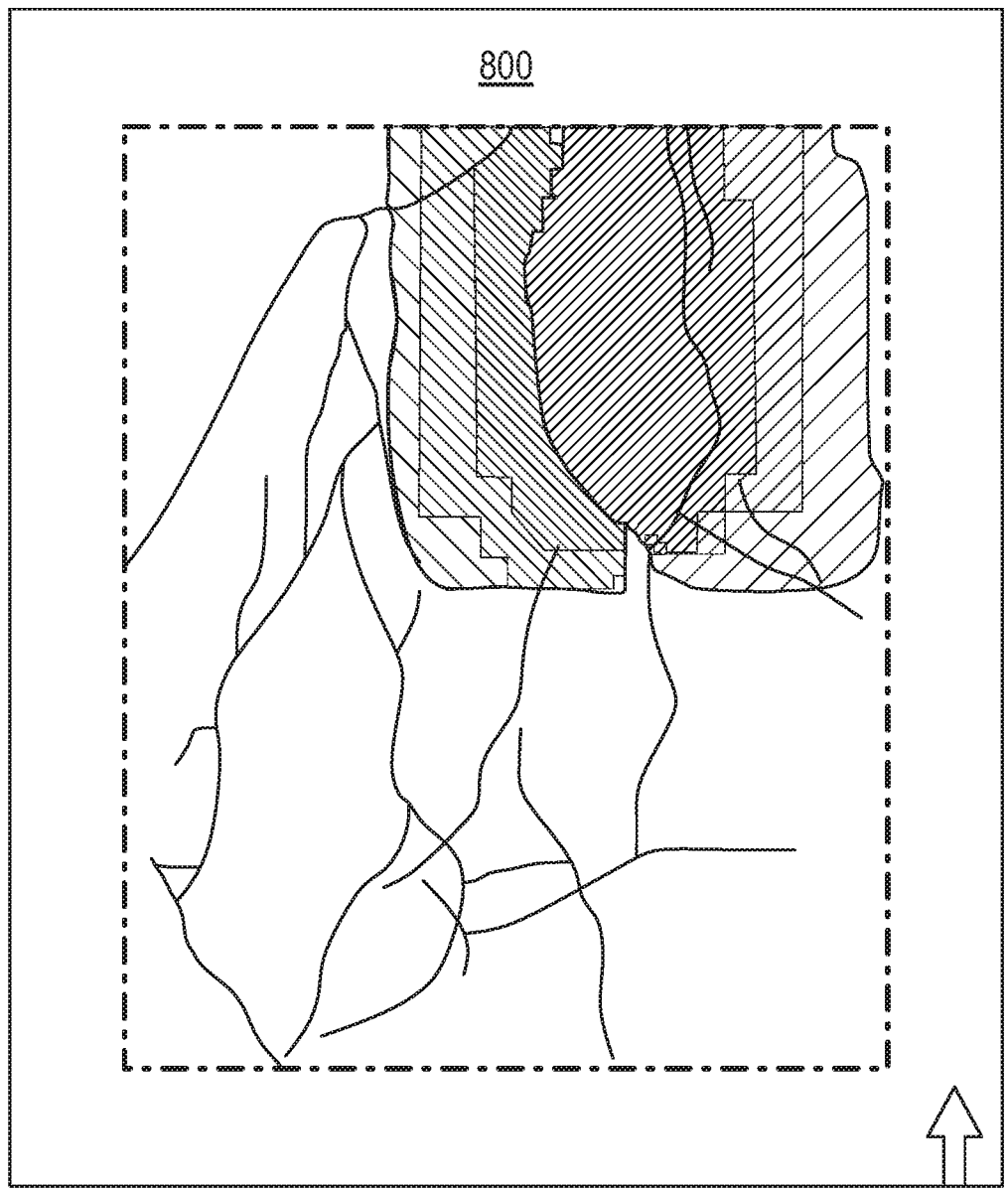
FIG. 8 illustrates an example of a graphical user interface as rendered to a display.

FIG. 8 shows an example of a graphical user interface (GUI) 800 of a portion of a grid that includes a fault demarcated by open circles where a radiation technique illuminates one side in red and illuminates another, opposing side in blue. In such an example, the fault may be considered a radiation source or radiation sources (e.g., a radiator that radiates different types of radiation, a first type to one side of the fault and a second type to another, opposing side of the fault). As an example, a fault may be considered a radiation type of structure utilizing such a technique (e.g., an antenna, a lens, a body, etc.). In such an example, the surface shape (e.g., multidimensional) of the fault may direct radiation in a particular direction or directions such that cells are illuminated (e.g., illumination values can be generated for individual cells). As an example, radiation emitted by the fault, according to such a technique, may decay with distance from the fault. For example, a distance-based decay function may be utilized, which may optionally have an analog in real-world physics (e.g., as to decay of energy from a source due to one or more effects, such as increasing volume, increasing area, absorption, attenuation, etc.).

As illustrated in the GUI 800 of FIG. 8, a method can assign a light source to each fault face, illuminating its respective volume (e.g., "hemisphere" or other volumetric space) with light of either "plus" or "minus" color. As an example, a cumulative amount of illumination in each cell center may be calculated to determine a dominant color of a cell. For example, consider the lower open circle of the GUI 800 of FIG. 8 where illumination from both sides may fall upon (or into) one or more cells. In such cells, two values may be present, a red value and a blue value where a decision can be made based on comparing the magnitude of the red value to the magnitude of the blue value to determine whether a particular cell is to be assigned to one side of the fault or to be assigned to the other side of the fault. For example, such an approach can be used to decide whether a cell belongs on the plus or minus side of the fault such that a "side property" is created for that cell.

Naïve implementation of such a radiation/illumination approach can perform poorly (e.g., of the order of hours for a mid-sized model). As an example, to increase performance of a computing device or computing system that performs a radiation/illumination approach, a level-of-detail based technique can be implemented. In such an example, a speed increase of the runtime can be realized (e.g., down to seconds for a mid-sized model). In such an example, the speed of the computing device or computing system is increased, which may be part of an overarching device or system for analyzing seismic data to generate an improved model of the Earth (e.g., as imaged via seismic tomographic scanning). As an example, an improved model of the Earth may be rendered to a display as an improved image of the Earth (e.g., via cells, pixels, lines, nodes, layers, etc.).

As an example, a method can include implementing a near-fault adjustment for a radiation/illumination approach. Such an adjustment may help to improve certainty as to assignment of a cell. For example, to address near-fault uncertainty caused by a light approximation method, a method can include adjusting via a near-fault flood fill. In such an example, cells within a cell-distance (e.g., one cell away, two cells away, etc.) may be "flooded" to be filled with a value that can be a high value. Such an approach can flood fill cells to one side of a fault with one radiation (e.g., red) and flood fill cells to another side of the fault with another radiation (e.g., blue) where such cells meet one or more criteria (e.g., within two cells of the fault, etc.).

As an example, a method can include generating side properties and then combining the side properties (e.g., one for each fault) into a single compartment property. Such an approach can take into consideration one or more truncations of a fault, which may be, for example, user defined truncations (e.g., as set via an interactive GUI, etc.). As an example, a truncation can limit an area where a fault is used to split space into separate compartments.

As an example, each cell can be assigned as many side properties as there are faults of interests in a model. As an example, a compartment number can be produced by stringing the side properties as bits (e.g., true/false) and reading the result as an integer. However, such an approach may generate an excessive number of compartments such that they demand merging according to one or more truncation rules. As an example, a method may implement a multidimensional flood fill to perform, at least in part, side property assignments.

As an example, as fault truncations are not necessarily readily available, a method can include analyzing a configuration of faults in a grid for producing a list of suggested truncations, which, for example, a user can utilize as an input for a compartments merging process. As an example, consider a process where cells directly attached to faults are collected. From this collection, the process can recognize fault-fault interactions as one or more of various different types of truncations (e.g., plus, minus, crossing or relay). Such a process may then utilize the side properties to find cases where a fault extension interacts with an actual fault. In such an example, when a set of exclusion rules is applied, the process can produce a good starting point (e.g., for a user, a computing device, a computing system, etc.).

As an example, a method can include dividing space via a radiation/illumination approach as an extension of a subset of real-world boundaries (e.g., as indicated by seismic and/or other data).

As an example, a method can reliably achieve compartmentalization on wide variety of models of a subterranean region where such models can be based at least in part on data such as, for example, seismic data. As an example, a method can provide for user control, for example, allowing for input via an interactive GUI that can control a computerized algorithm through selection of a fault of interest and defining one or more truncation rules. As mentioned, a method can reduce computational demand such that interactions via a GUI can be processed in real-time (e.g., of the order of seconds from input to rendering of results based thereon). As an example, a method can provide a runtime is sufficiently low that it allows for an interactive workflow, where a user can iteratively modify one or more inputs, re-running a computerized algorithm and repeat until a desired outcome is achieved.

As an example, a method can include utilizing fault radiation to determine on which side of each fault a cell belongs and can include utilizing sidedness to produce a compartment property so that two cells that are on different sides of a fault (e.g., that is influential in the area) are assigned a different compartment number.

As to a side property creation, fault radiation may be utilized. Such an approach can generate results that are visually assessable when rendered to a display. For example, consider the GUI 800 of FIG. 8 where red and blue distinguish sides of a portion of a fault as demarcated by the open circles (e.g., truncation indicators, etc., which may be adjustable interactively via input as facilitated by the GUI such as via touch, a mouse, a stylus, etc.). Such an approach can facilitate assignment and/or decision making as to a cell or cells and sidedness thereof. For example, there can be areas where a decision whether a cell belongs to one side of the fault or another is ambiguous at best. An approach as in the GUI 800 of FIG. 8 lessens that ambiguity and therefore, through computational techniques, improves such decision making.

As an example, a method can include approximating a surface of a fault as a series of directional spot lights (e.g., one per each fault face) with an approximately 180 degree angle (e.g., in a range from approximately 150 degrees to approximately 210 degrees) and cosine attenuation (e.g., or another attenuation, which may be user selectable). As an example, intensity of light can be determined to fall off with the square of the distance (e.g., for distance d, radiation intensity $I_r$, diminishes as $I_r/(d^2)$).

As explained, each fault can have two sides. As an example, spotlights can assign to a plus side emission of a "plus color" while spotlights can assign to a minus side emission of a "minus color". A cumulative effect of these spotlights can be calculated for each cell (e.g., for each cell center or other geometric/spatial metric). As an example, a predominant "color" can be utilized to determine on which side a cell falls (e.g., a cell is to side 1 or a cell is to side 2 of a fault that has side 1 and side 2).

Referring again to the GUI 800 of FIG. 8, the colors of red and blue can be radiation property values (e.g., fault radiation property values) where red is radiation emitted by one side of the fault and where blue is radiation emitted by another, opposing side of the fault. Such an approach may be implemented in a framework such as, for example, the PETREL® framework.

As an example, a method may be implemented in a serial manner and/or in a parallel manner. As to a parallel manner, complexity can be of O(m*n) where m is number of faults and n is number of cells, which may result in relatively long runtimes. As mentioned, a technique may be implemented to reduce runtime (e.g., reduce computational resource demand, etc.). As an example, a fault radiation speedup approach may be implemented. To ensure a method is performant (and so increasing its usefulness) a level-of-detail approach may be used to speed up fault radiation processing.

Referring again to the GUI 800 of FIG. 8, visually, in most areas of the grid, the cell sidedness is relatively unambiguous and can be easily determined by a coarse approximation.

For example, consider a method of approximation that is to: Split a grid bounding box into regular sectors of 24×24×12 resolution; Determine into which sector each spotlight belongs; Calculate a single cumulative spotlight in each sector as a sum of the spotlights in it, for example, where the cumulative light sources emit approximately the same amount of light as the individual light sources combined (in such an example, where the condition is not sufficiently met according to one or more criteria, one or more adjustments may be made); Calculate coarse illumination in each sector using the coarse light sources; and Find sectors where a high-resolution calculation is to take place. For example, such sectors can be the sectors that have a neighbor with a different predominant "side color" from its own. Such an approach can prepare a coarse illumination approximation throughout a desired volume of a grid and determine areas where a fine-grained calculation is to take place for additional decision making (e.g., as to sidedness of at least a portion of the cells within the desired volume of the grid).

As an example, a method can include processing individual cells that do initially fall into a sector that has been marked for high resolution computation. Such a method can include a process to: Calculate illumination of the cell center by the light sources in this sector and neighboring sectors; and Add illumination from other sectors, using the coarse, sector based light source approximation. In such an example, cells that fall into sectors that are not singled out for high resolution calculation can be assigned the coarse sectors illumination. Such an approach can reduce runtime from hours to seconds. Such an approach can reduce runtime without a substantial (e.g., visually noticeable, etc.) difference in assignment of cell sidedness.

As mentioned, a method may employ a near-fault flood fill. As an example, fault faces may be treated as area light sources. However, such an approach may not be practical computationally with respect to a grid. Thus, as an example, an approximation as point light sources can be utilized. Such an approximation may be employed in a near-fault manner as the particular issue may not generally be a concern further away from a fault. Specifically, in a relatively close vicinity of a fault, possible errors may arise where, for example, a cell center falls into a shadow of a nearby point source (e.g., a particularly useful point source) and is thereby at risk of being wrongly assigned because light sources from the opposite side of the fault contribute more to that cell than the appropriate light source(s).

As an example, near-fault flood fill can be used where cells directly adjacent to fault can be defined as "seeds" with a fault-distance equal to zero (e.g., or 1 or other appropriate value). From such seeds, a flood fill can be implemented to immediate neighbors of such seeds, for example, by directly assigning them to belong to either "plus" or "minus" side (e.g., maximizing intensity of a side color). As an example, where an adjacent cell (e.g., a seed) has a value of zero, a flood fill approach may be implemented with a depth of flood fill of 2 (as to neighboring a seed).

As an example, there may be cells that have faces interacting with both sides of the fault. In such an example, "double-assigned" cells may be set aside and not processed via the flood fill process.

As to side property merging into compartments, a method can provide side properties that assign a fault side to individual cells for a fault or faults. As an example, consider an approach that utilizes a cell-bound bit-array where each bit represents a fault side. In such an example, if the bit is "true" it means the cell is on the "plus" side of a respective fault; whereas, if the bit is "false" it means the cell is on the "minus" side of the respective fault.

Such bit-arrays can be interpreted as integers (e.g., in binary format) producing a compartment number. A process of re-numbering these values to produce a sequential numbering may be employed, as desired.

As to fault truncation rules, a user may expect that some faults have limited influence and that there are areas where a fault extension will not affect compartmentalization. Such expectations may be expressed as one or more truncation rules. An example of a truncation rule is: "Fault-A is truncated on the hangingwall (plus side) of Fault-B". This means that a user expects that the Fault-A have no influence on the footwall (minus side) of the Fault-B.

Figure 9A:
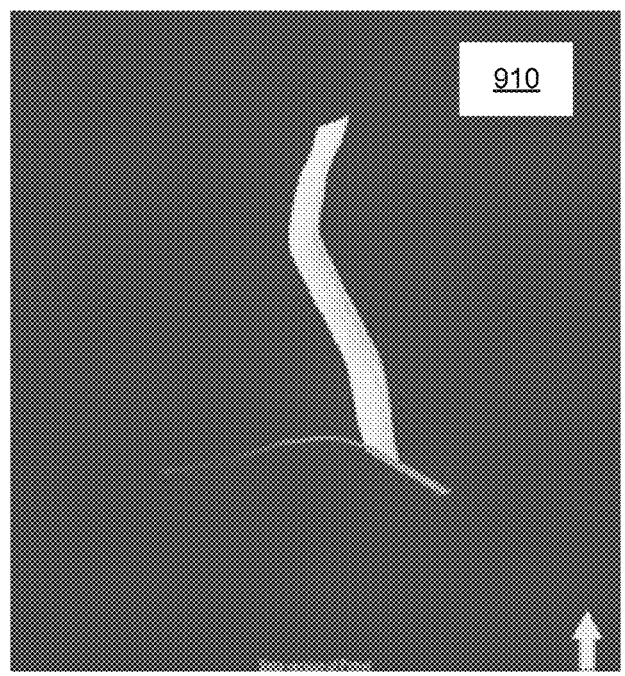
FIGS. 9A, 9B and 9C illustrate examples of graphical user interfaces.
Figures 9B, 9C:
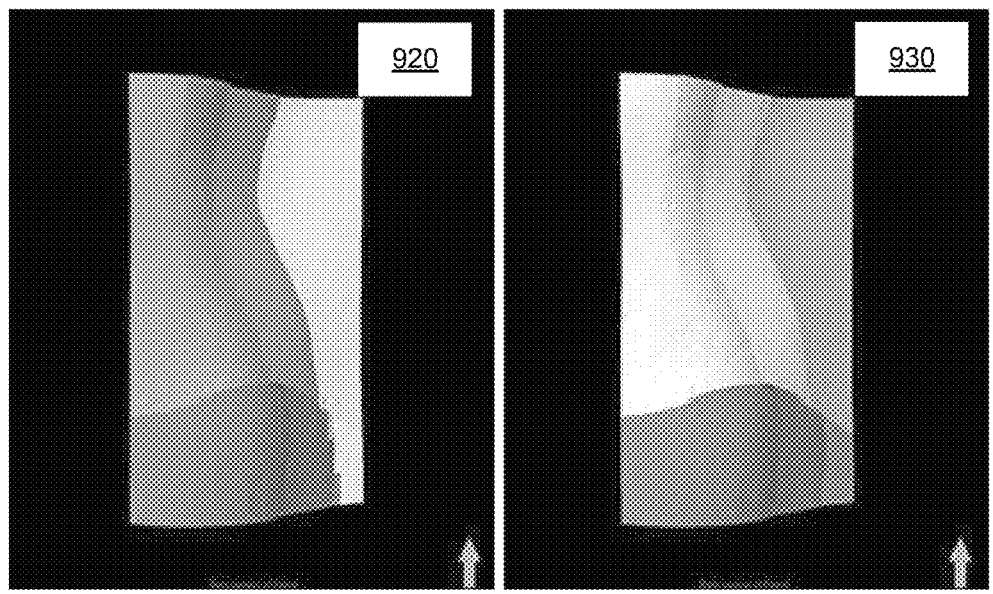

FIG. 9A shows an example of a GUI 910 that illustrates a scenario where Fault-A (green) is truncated by Fault-B (yellow). FIGS. 9B and 9C show examples of GUIs 920 and 930, respectively, for two cases. In the GUI 920, the case concerns unmerged compartments where no truncation rules are applied and Fault-A extends across Fault-B; whereas, in the GUI 930, the case demonstrates an expected output where truncation rule(s) was/were applied and Fault-A has no influence on the other side of Fault-B. The two scenarios of FIGS. 9A and 9B can be referred to as unmerged (GUI 920) and merged (GUI 930) as to compartments according to truncation rules.

The examples of FIGS. 9A, 9B and 9C demonstrate such scenarios with relatively simple structure (e.g., fault geometries); noting that more complex scenarios can arise and include more faults where a truncation definition can be more complex. As an example, a truncation rule generator may be included as part of a framework that processes cells of a grid to determine sidedness. Such a generator may be part of a GUI of the framework where a user can interact to select and/or define truncation rules to be applied to one or more portions of a model of a subterranean region that includes faults. As an example, a model may be accompanied by predetermined truncations or truncation rule(s), which may optionally be adopted. As an example, a method can include truncation detection, such that truncations are detected and/or generated automatically.

As an example, a compartments merging computational algorithm can be implemented to perform merging, which can be a type of a multidimensional flood fill, utilizing truncation rule(s) to determine which compartments are to be assigned a particular compartment number. Such an approach can include perturbing one bit at a time and determining whether the respective fault has influence in that area according to the truncation rules.

As an example, a computational algorithm for merging can operate to: Insert existing side property combinations (e.g., the above-mentioned bit arrays) into an "input set"; Take the first "bit array" from the "input set" and insert it into a "seed set"; Increment a "compartment number"; Process an element from the "seed set" as "seed"; Assign a current "compartment number" with the current "seed" (e.g., using a "bit array" to compartment number map); Examine individual existing neighbors (e.g., by perturbing each bit) as to whether a truncation rule exists that would "shade" the respective fault (at the position of the perturbed bit); If this is so, insert the "neighbor" into the "seed set"; After examining the neighbors, remove the current "seed" from the "seed set" as well as from the "input set"; If the "seed set" is not empty the algorithm continues to process an element from the "seed set" as "seed"; If the "seed set" is empty the algorithm continues to take a bit array (see above); and If the "input set" is empty the algorithm may be terminated. Such an approach can generate a map from each of a plurality of existing "bit arrays" to a sequential compartment number. In such an example, a method can include associating a compartment number with each of a plurality of cells in at least a portion of a model based on respective side properties.

As to truncation detection, fault truncations definition can be an input to a method such that it can inform a compartments merging computation algorithm where a fault is to have an influence and where it is to be ignored. As an example, a truncations configuration set may vary based on a user targeted workflow and deeper analysis of the geology of the model. Therefore, a user may have a final approval and can exercise judgement to influence the resulting compartmentalization. As mentioned, one or more GUIs may be rendered to a display that allow for such user interactions, which may be performed in a manner where a computing device or system is responsive to input in near-real time to perform one or more computations and to render results to a display (see, e.g., GUIs of FIG. 8, FIGS. 9A, 9B and 9C).

Various truncations can be unambiguous and can be detected programmatically (e.g., automatically) to, for example, provide a user with a good starting point. As an example, a method can be implemented for producing an initial truncation set(s) from a grid itself (e.g., optionally without additional information).

As an example, consider a method that includes detecting direct fault-fault interactions and classifying such detected interactions. Such a method can include detecting where a fault extension intersects another fault. The result from detecting and classifying can be utilized to cull some unwanted detections as to fault extensions. In such an example, an output can be two sets of truncations that a user may review and optionally adjust, as desired (e.g., via a GUI, etc.).

As to face assignment, a process can include iterating over faults and collecting cells adjacent to each fault side. In such an example, cells that are found to be adjacent to both sides of a fault can be excluded and not participate in further processing. As an example, cell sets can be used to detect fault-fault interactions. For example, a computational algorithm can test each fault against other faults and it can counts how many cells from one fault's cell-set(s) can be found in another fault's cell-set(s). Such counts can be used to determine a type of truncation.

As an example, a fault can have two cell sets, a "plus-set" and "minus-set". In such an example, the plus-set from one fault can be intersected with the "plus-set" and the "minus-set" of another fault. Such an approach can be implemented for a "minus-set" of the first fault. Application of such an approach can result, for example, in four integer numbers, indicating the number of intersecting cells.

As to possible configurations, consider the following: Plus-plus and plus-minus intersections are non-zero→"plus-truncation"; Minus-plus and minus-minus intersections are non-zero→"minus-truncation"; Intersection counts are non-zero→"crossing fault"; One intersection count is zero→"relay fault"; and Other configuration→"no truncation".

As an example, to reduce computational demand, a method may employ hash-sets, which may speed-up intersection counting. Such an approach allows for keeping algorithmic complexity of $O(n*m)$ where n is the total number of cells adjacent to faults considered and m is the number of faults. Note that "plus-truncation" and "minus-truncation" can be subsequently utilized by a compartments merging computational algorithm. As an example, relay and crossing truncations may be disregarded.

As to fault extension truncation detection, consider a method that includes detecting whether a fault extension intersects a fault. Such a method can include combining information produced in a "face assignment process" with, for example, a "fault side properties" generation process. Such a method may again test a fault against other faults of interest.

As an example, a method can include, for each fault-fault iteration considered, looking up the "side property" values of one fault for each cell adjacent to the other fault and counting the number of cells on each side. In such an example, if they are both non-zero, truncation has been detected. In other words, if cells adjacent to one fault are found on both sides of the other fault, the one fault is considered truncated by the other fault. Note that a fault extension detection process may not distinguish on which side the truncation occurred. In such circumstances, a truncation side detection process may be implemented.

As to a truncation side auto-detection process, a compartments merging process may utilize truncations that have a defined sidedness (e.g., on which side of the truncator fault the truncated fault ends). In various situations, for a user, it may be difficult to know the sidedness of truncations. As an example, a process can be implemented to detect this sidedness automatically, for example, whenever the sidedness of the truncation may not be available prior to passing the truncations into a compartments merging process.

As to sidedness detection, it can include combining a "side property" of a truncator with "adjacent cells" of the truncated fault. Such a process can include assigning sidedness based on where a majority of adjacent cells can be found (e.g., if most of the "adjacent cells" of the truncated fault are found on the "plus side" of the truncator, the truncation is marked as "plus truncation" and vice versa).

As to truncation exclusions, a fault extension truncation detection process may tend to be overly inclusive, detecting and adding some truncations that may be considered superfluous. As an example, a method can include a process that can help to address such over inclusion via one or more rules such as: If a truncation is detected again by a fault extension process (e.g., "truncated-truncator" pair previously found by the face assignment process), it is not added again to the resulting set. Such an approach can consider that a face assignment detects a truncation type, while a fault extension process may not. Truncation types such as "relay" and "crossing" may be ignored by a compartments merging process. As an example, adding a truncation again by a fault extension process may force these to be auto-detected later as "plus" or "minus" truncation and, for example, ultimately utilized by a merging process.

As an example, where two faults are found on opposing sides of another fault, one or more truncations between the two faults may be ignored. Such an approach can help to mitigate superfluous truncations that may possibly make detected truncations more difficult to read.

Figure 10:
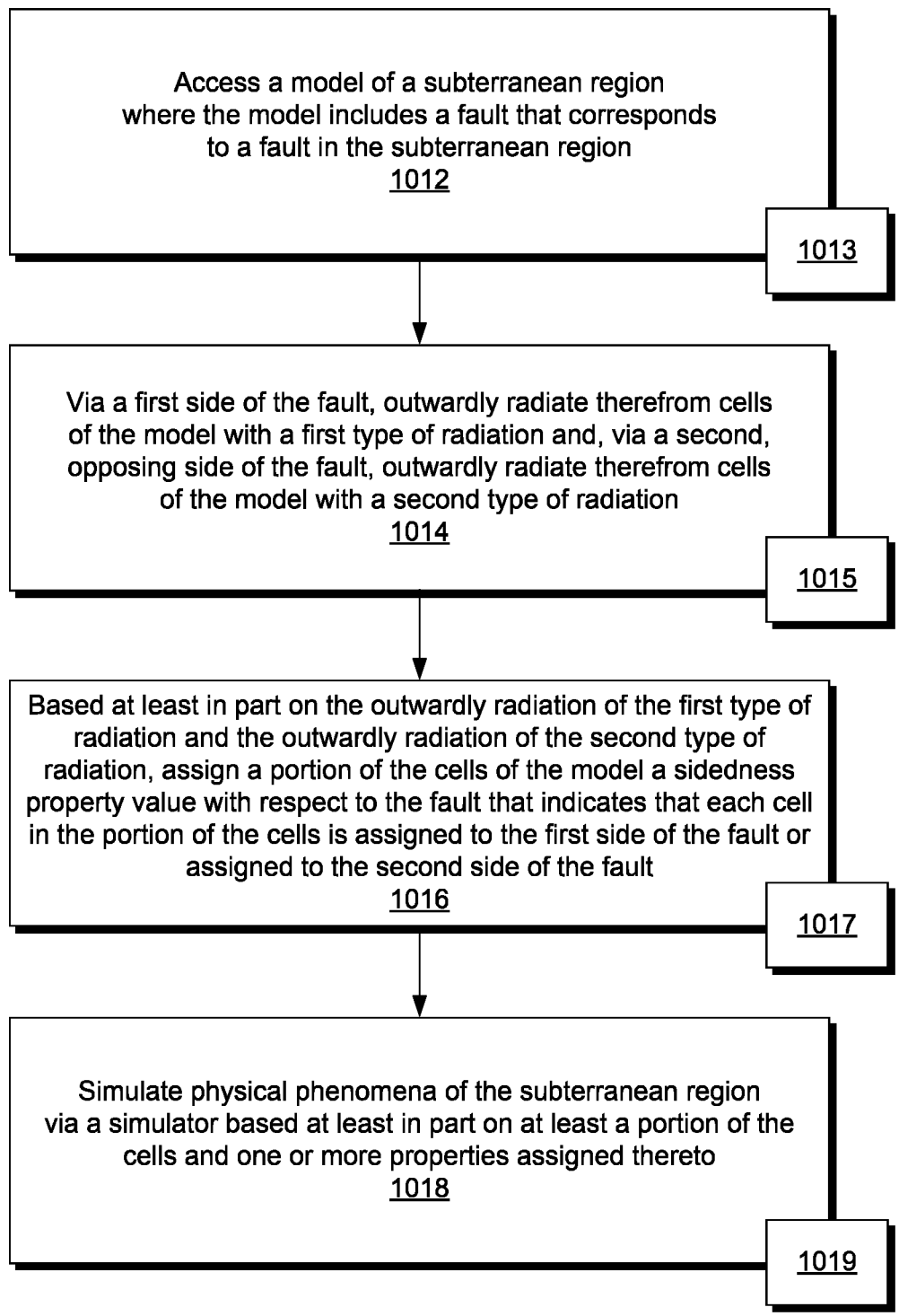
FIG. 10 illustrates an example of a method.

FIG. 10 shows an example of a method 1000 that includes an access block 1012 for accessing a model of a subterranean region where the model includes a fault that corresponds to a fault in the subterranean region; a radiation block 1014 for, via a first side of the fault, outwardly radiating therefrom cells of the model with a first type of radiation and, via a second, opposing side of the fault, outwardly radiating therefrom cells of the model with a second type of radiation; an assignment block 1016 for, based at least in part on the outwardly radiating of the first type of radiation and the outwardly radiating of the second type of radiation, assigning a portion of the cells of the model a sidedness property value with respect to the fault that indicates that each cell in the portion of the cells is assigned to the first side of the fault or assigned to the second side of the fault; and a simulation block 1018 for simulating physical phenomena of the subterranean region via a simulator based at least in part on at least a portion of the cells and one or more properties assigned thereto. Such a method can improve performance and results of a simulator. For example, where properties are assigned to cells in a model that includes faults in a more accurate manner, physical phenomena may be simulated more accurately and/or in a manner that generates a solution, which may be in lesser amount of time due to rate of convergence, etc. As an example, a model may be prepared more expeditiously for input to a simulator via the method 1000 of FIG. 10, for example, where portions of the method (e.g., blocks 1014 and 1016) can operate in an interactive manner during a workflow such that a user can more accurately and expeditiously prepare the model and its properties for input to a simulator.

As an example, outwardly radiating can be performed by considering a side of a fault as a surface where such a surface may be a radiation source such that radiation emanates from the surface. As an example, radiation may be emanated over a span of angles. As an example, radiation may be emanated in a direction normal to a surface that represents a side of a fault. As an example, where a fault includes a plurality of normals, locally, each of the normals may be a direction of radiation. As an example, radiation may be static in that it is a pattern of radiation that exists for a side of a fault, which may be in the form of a spatial function, an overlay, etc., such that values can be determined for a sector and/or individual cells in a model. As an example, one or more radiation techniques may be employed to outwardly radiate radiation from a side of a fault such that cells are irradiated, for example, to determine sidedness, compartment, etc., which may be utilized for purposes of property assignments for properties that may be utilized by a simulator.

As mentioned, a method can include generating compartments for volumetric cellular grids with faults. Compartmentalization can be an input into reservoir modelling workflow and/or an engineering workflow, for example, to assign different properties in different part of the reservoir as modeled by cells. Such an approach may be utilized when defining gas-oil and/or oil-water contact and/or fluid properties, which may be across geological boundaries for estimation of volume of reserve, prediction of production, response to field operation(s), etc.

As mentioned, a feature of compartmentalization can be that two cells that are on opposing sides of a fault of interest are assigned a different compartment number (e.g., while optionally keeping a total number of compartments to a minimum). Such compartmentalization can be performed in a manner that can account for one or more scenarios where it may be expected that a fault may "extend" beyond its actual physical span. As an example, one or more processes can be implemented associated with truncation where, for example, a fault is truncated by one or more other faults; noting that such truncation may divide a fault (e.g., into two or more portions). As mentioned, a truncation process or processes may be interactive in that a GUI may be rendered to a display that allow for user input to assess, make, adjust, etc., one or more truncations. As an example, a GUI may allow a user to select a fault of interest and to assess, make, adjust, etc., one or more truncations of the fault.

As an example, a method can include fault radiation, a tiered approach to fault radiation (e.g., expedited with coarse and fine tiers) and/or a near-fault flooding (e.g., near-fault flood fill) for purposes of sidedness determinations (e.g., sidedness property assignment, etc.). As an example, a method can include merging sidedness property information to form compartments (e.g., compartment properties), such a process may include utilization of one or more fault truncation rules and, for example, a computational compartments merging algorithm. As an example, a method can include truncation detection, which may include a face assignment process, a fault extension truncation detection process, a truncation side auto-detection process and/or one or more truncation exclusion processes. As an example, a workflow can include one or more methods and/or one or more processes as mentioned above or otherwise herein.

The method 1000 is shown in FIG. 10 in association with various computer-readable media (CRM) blocks 1013, 1015, 1017 and 1019. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1000. As an example, the one or more blocks 1013, 1015, 1017 and 1019 may be instructions such as, for example, one or more of the sets of instructions 270 of the system 250 of FIG. 2.

Figure 11:
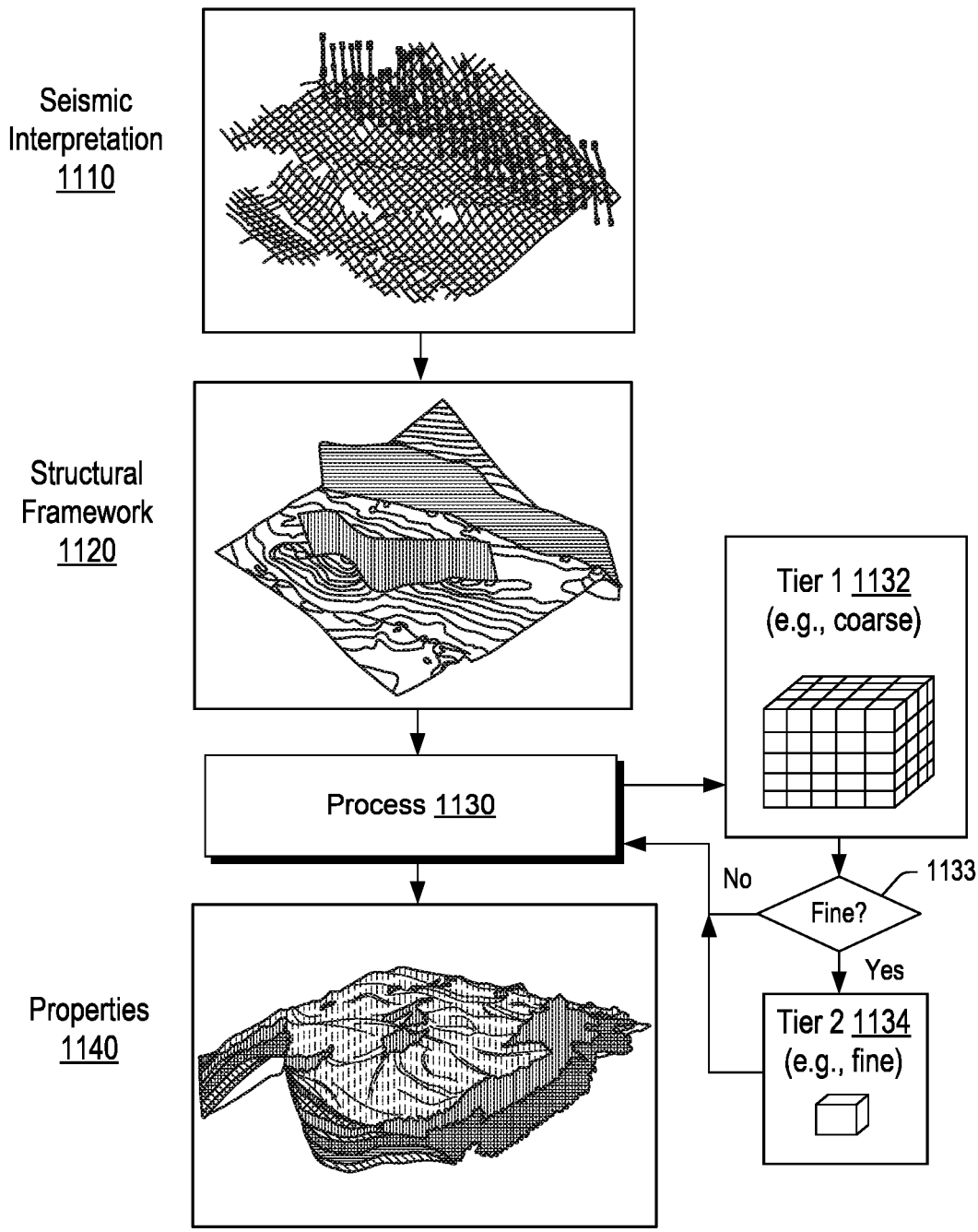
FIG. 11 illustrates an example of a method.

FIG. 11 shows an example of a method 1100 that includes a seismic interpretation block 1110 for accessing at least seismic data as acquired by one or more sensors that sense seismic energy that travels in a subterranean environment (e.g., a subterranean region), for performing a seismic interpretation based at least in part on at least a portion of the data and generating information (e.g., locations of structures, etc.). The method 1100 also includes a structural framework block 1120 for generating one or more structures (e.g., structures within a model, etc.) that represent physical structures in the subterranean environment. For example, interpretation may identify a horizon and structural model can include that horizon as a data-based structure with a likelihood that it actually exists in the subterranean environment given variations in seismic data (e.g., variations in traces, etc.). The method 1100 includes a processing block 1130, which may implement one or more techniques that can enhance how properties are handled where such properties can include one or more properties that can be assigned to portions of a grid per the property block 1140. For example, consider compartmentalization as a technique that assigns compartment identifiers to a plurality of compartments based on a method such as portions of the method 1000 (e.g., blocks 1012, 1014 and 1016). Such an approach may utilize one or more types of radiation as part of a technique that facilitates identifying what cells are to be assigned particular properties, which may be properties utilized by a simulator (see, e.g., block 1018) to generate simulation results as to one or more physical phenomena.

As shown in the method 1100, the process 1130 can include multiple tiers 1132 and 1134, which may include a coarse tier and a fine tier where in the coarse tier 1132, sectors are utilized; whereas, in the fine tier 1134, individual cells are utilized, for example, on a cell-by-cell basis for cells in particular sectors that do not pass a test. For example, a decision block 1133 can provide for deciding whether a sector is to be passed to the fine tier 1134. As mentioned, where a sector differs in one or more characteristics from a neighboring sector, that sector may be selected per the decision block 1133 for processing on a cell-by-cell basis via the tier 1134. As shown, results from the tiers 1132 and 1134 can be passed to the process, which may utilize the results for assignment of properties, for example, via compartmentalization (e.g., sequentially numbered compartments that correspond to regions that may be segregated physically by one or more faults).

As mentioned, a method can include generation of a structural model, depospace transform, grid in depositional space, and depogrid in geological space. As an example, compartments may be defined as compartment properties for a depogrid that is suitable for input to a simulator.

As an example, a fluid flow simulation, which may be via one or more numerical methods (e.g., finite element, finite difference, etc.) where one or more equations that represent physical phenomena (e.g., Navier-Stokes, Darcy, etc.) can be specified with appropriate "connections" (e.g., cell-to-cell boundary conditions, etc.) such that a result of the fluid flow simulation is feasible and/or more accurate than without such one or more property representations, which may account for structural features such as faults. A compartmentalization approach may make a simulator more stable for a given reservoir being simulated and/or make results of the simulator more accurate and/or make the simulator run in lesser time and/or with lesser computational resources (e.g., less processor power, less memory, etc.). As an example, a simulation run may be lengthy, depending on the number of equations (e.g., as may be associated with grid size, etc.). As an example, a simulation run may be of the order of hours or, for example, days. As may be appreciated, computer resources tied up for hours executing a simulation run may, where stability is lacking, not generate a result or not generate a meaningful result.

A lower run turnaround time can increase benefits from a reservoir study allotted a budgeted time period. As a corollary, time spent in repeated runs fighting model instabilities or time-stepping can be counterproductive. Various factors can affect run time, for example, run time can equal the product (CPU time/step)×(number of timesteps). The first factor tends to be large and the second factor tends to be small for an implicit formulation, and conversely for the IMPES formulation. IMPES is a conditionally stable formulation that involves a timestep $\Delta t < \Delta t^*$ to reduce risk of oscillations and error growth, where $\Delta t^*$ can be defined as a maximum stable timestep. For IMPES, the conditional stability stems from the explicit treatment of nonpressure variables in interblock flow terms.

A simulator may utilize a preconditioner, for example, consider Nested Factorization (NF) and incomplete LU factorization [ILU(n)]. The term "LU factorization" refers to the factoring of a matrix A into the product of a lower triangular matrix L and an upper triangular matrix U, which can be computationally expensive and involve Gaussian elimination. The term "ILU(n)" denotes incomplete LU factorization, where limited fill-in is allowed and n is the order of fill.

NF can perform suitably under particular conditions such as when transmissibilities associated with a particular direction in a grid dominate those in other directions uniformly throughout the grid. ILU(n) or red-black ILU(n) tend to be less sensitive than NF to ordering of blocks and spatial variation of direction of dominant transmissibilities.

Transmissibility can be a measure of conductivity of a formation as to fluid. Transmissibility may be defined by a particular simulator in a particular manner. As an example, transmissibility may be defined with respect to viscosity (e.g., adjusted for viscosity, etc.). Some examples as to transmissibility are mentioned herein. As an example, a simulator may utilize transmissibility when performing simulation runs as to fluid movement in a reservoir and/or equipment (e.g., conduits, etc.) operatively coupled to the reservoir (e.g., via fluid communication, etc.).

The INTERSECT simulator uses a computational solver that can implement preconditioning where such preconditioning can involve algebraically decomposing a system of equations into subsystems that may be handled based on their particular characteristics to facilitate solution. Resulting reservoir equations can be solved numerically by iterative techniques until convergence is reached for the entire system of equations, which can account for one or more wells, one or more surface facilities, etc.

The INTERSECT simulator framework can provide for field tasks as to field operations, which may include operations as to surface facilities. As to an example of a workflow, consider a simulation that accounts for over 100 producing well and includes millions of cells in an unstructured grid, which can structurally model more than 10,000 fractures. As an example, time during execution of a run can include tasks such as evaluate residual and assemble Jacobian matrix, linear solver, nonlinear update and nonlinear convergence test. In such an example, time may be predominantly spent on the linear solver, followed by the evaluation of residual and assembly of the Jacobian matrix.

Figure 12:
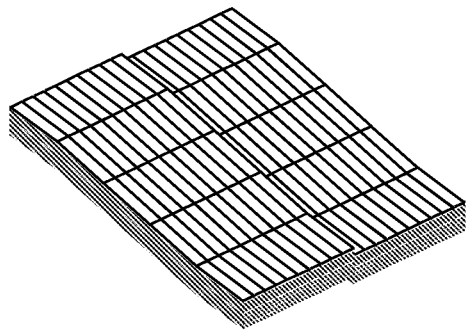
FIG. 12 illustrates an example of a method.
Figure 12:
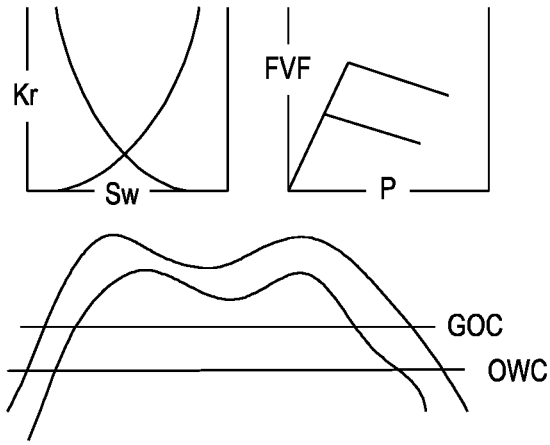
Figure 12:
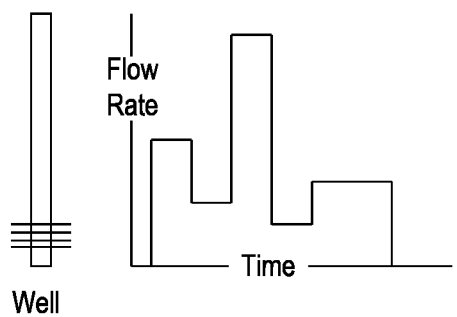

FIG. 12 shows an example of a method 1210 that includes a calculation block 1220 for calculating pore volumes, transmissibilities, depths and NNCs, an initialization and calculation block 1240 for initializing and calculating initial saturations, pressure and fluids in place, and a definition and time progression block 1260 for defining one or more wells and surface facilities and advancing through time, for example, via material balances for individual cells (e.g., with the one or more wells as individual sinks and/or sources). In such an example, the block 1220 may include one or more sets of instructions for generating, adjusting, etc. one or more grids, which may represent one or more faults, a portion of a fault, etc.

As to the initialization and calculation block 1240, for an initial time (e.g., to), saturation distribution within a grid model of a geologic environment and pressure distribution within the grid model of the geologic environment may be set to represent an equilibrium state (e.g., a static state or "no-flow" state), for example, with respect to gravity. As an example, to approximate the equilibrium state, calculations can be performed. As an example, such calculations may be performed by one or more sets of instructions. For example, one or more of a seismic-to-simulation framework, a reservoir simulator, a specialized set of instructions, etc. may be implemented to perform one or more calculations that may aim to approximate or to facilitate approximation of an equilibrium state. As an example, a reservoir simulator may include a set of instructions for initialization using data to compute capillary and fluid gradients, and hence fluid saturation densities in individual cells of a grid model that represents a geologic environment.

As an example, a reservoir simulator may advance in time. As an example, a numeric solver may be implemented that can generate a solution for individual time increments (e.g., points in time). As an example, a solver may implement an implicit solution scheme and/or an explicit solution scheme, noting that an implicit solution scheme may allow for larger time increments than an explicit scheme. Times at which a solution is desired may be set forth in a "schedule". For example, a schedule may include smaller time increments for an earlier period of time followed by larger time increments.

A solver may implement one or more techniques to help assure stability, convergence, accuracy, etc. For example, when advancing a solution in time, a solver may implement sub-increments of time, however, an increase in the number of increments can increase computation time. As an example, an adjustable increment size may be used, for example, based on information of one or more previous increments.

As an example, a numeric solver may implement one or more of a finite difference approach, a finite element approach, a finite volume approach, etc. As an example, the ECLIPSE® reservoir simulator can implement central differences for spatial approximation and forward differences in time. As an example, a matrix that represents grid cells and associated equations may be sparse, diagonally banded and blocked as well as include off-diagonal entries. As an example, the INTERSECT simulator may be implemented.

As an example, a solver may implement an implicit pressure, explicit saturation (IMPES) scheme. Such a scheme may be considered to be an intermediate form of explicit and implicit techniques. In an IMPES scheme, saturations are updated explicitly while pressure is solved implicitly.

As to conservation of mass, values (e.g., for water, gas and oil) in individual cells of a grid cell model may be specified to sum to a certain value, which may be considered a control criterion for mass conservation. As black oil equations tend to be non-linear, a Newton-Raphson type of technique may be implemented, which includes determining derivatives, iterations, etc. For example, a solution may be found by iterating according to the Newton-Raphson scheme where such iterations may be referred to as non-linear iterations, Newton iterations or outer iterations. Where one or more error criteria are fulfilled, the solution procedure has converged, and a converged solution has been found. Thus, within a Newton iteration, a linear problem is solved by performing a number of linear iterations, which may be referred to as inner iterations.

As an example, a solution scheme may be represented by the following pseudo-algorithm:

```
// Pseudo-algorithm for Newton-Raphson for systems
initialize(v);
do {
   //Non-linear iterations
   formulate_non_linear_system(v),
   make_total_differential(v);
   do {
      // Linear iterations:
      update_linear_system_variables(v),
   }
   while((linear_system_has_not_converged(v));
   update_non_linear_system_after_linear_
      convergence(v),
}
while((non_linear_system_has_not_converged(v))
```

As an example, a solver may perform a number of inner iterations (e.g., linear) and a number of outer iterations (e.g., non-linear). As an example, a number of inner iterations may be of the order of about 10 to about 20 within an outer iteration while a number of outer iterations may be about ten or less for an individual time increment.

As mentioned, a grid may be revised (e.g., adjusted, etc.) based at least in part on simulation results, which may optionally include results such as convergence behavior. For example, where convergence may be possibly improved, one or more adjustments may be made to a grid where such one or more adjustments may allow for convergence, expedite convergence, etc.

Figure 13:
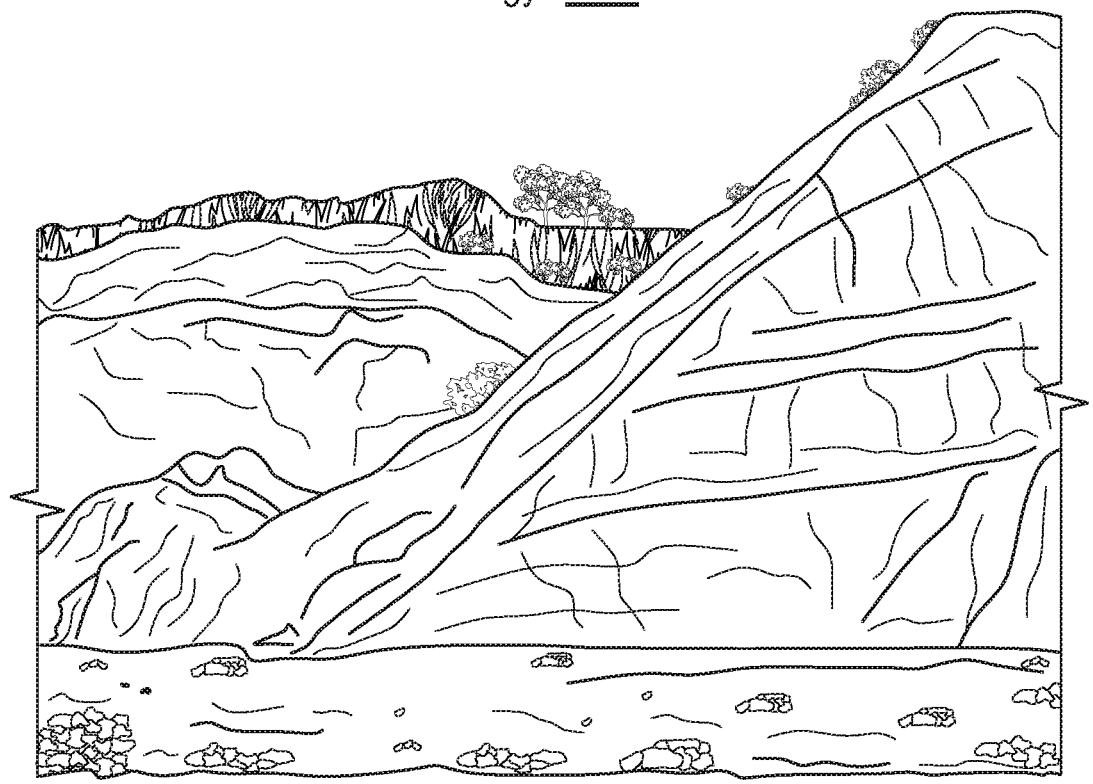
FIG. 13 illustrates an example of a portion of a geologic environment.

FIG. 13 shows an example of geology 1310 of a geologic environment where various structural features can be observed. One or more of such features may exist in a subterranean environment (e.g., a subterranean region) that can be represented via one or more grids (e.g., one of sets of cells, etc.).

As an example, a method can include accessing a model of a subterranean region where the model includes a fault that corresponds to a fault in the subterranean region; via a first side of the fault, outwardly radiating therefrom cells of the model with a first type of radiation and, via a second, opposing side of the fault, outwardly radiating therefrom cells of the model with a second type of radiation; and, based at least in part on the outwardly radiating of the first type of radiation and the outwardly radiating of the second type of radiation, assigning a portion of the cells of the model a sidedness property value with respect to the fault that indicates that each cell in the portion of the cells is assigned to the first side of the fault or assigned to the second side of the fault.

As an example, a method can include splitting a model into sectors where each of the sectors includes a portion of cells of the model and where the portion of the cells can be assigned a sidedness property value. For example, an entire sector may be assigned a common sidedness property. In such an example, one or more sectors may be assigned a common compartment property. As an example, a method can include assigning a plurality of compartment properties to a plurality of sectors where at least some of the compartments include a plurality of sectors. As an example, a compartment can include cells that are assigned a sidedness property via a coarse tier and can include cells that are assigned a sidedness property via a fine tier (see, e.g., the tiers 1132 and 1134 of FIG. 11).

As an example, a method can provide for a number of assigned sidedness property values for a corresponding number of the cells and assigning at least one compartment property value. In such an example, each of the at least one compartment property values can be or include an identifier that is a member of a group of sequential identifiers for corresponding spatially defined compartments within the model.

As an example, a method can include detecting at least one truncation of a fault by another fault where assigning at least one compartment property value is based at least in part on the detecting. For example, one side of the fault can be assigned at least two compartment property values based at least in part on a detected truncation of the fault by another fault (e.g., where the fault has a portion extending to one side of a fault that truncates and where the fault has a portion to another side of the fault that truncates it). As an example, a truncation can be a division of a fault such that the fault is segmented.

As an example, a method can include identifying a first sector composed of a portion of the cells that has a predominant sidedness property value where the predominant sidedness property value differs from that of a second sector composed of a different portion of the cells where at least some of the cells of the first sector and the second sector are adjacent cells. In such an example, a method can include performing radiation calculations on each of the cells in the first sector to assign a sidedness property value to each of the cells (e.g., consider a fine tier, etc.).

As an example, a method can include performing tiered assigning where one tier assigns cells sidedness property values on a cell sector basis and where another tier assigns cells sidedness property values based on an individual cell basis (see, e.g., the tiers 1132 and 1134 of FIG. 11).

As an example, a first type of radiation and a second type of radiation can decay with respect to distance from a fault. For example, consider an energy type of decay or other function.

As an example, a method can include rendering, to a display, a first type of radiation in a first color and a second type of radiation in a second color. As an example, a model can include a plurality of faults and a method can include, for each of the individual faults, via a first side of an individual fault, outwardly radiating therefrom cells of the model with a corresponding type of radiation and, via a second, opposing side of the individual fault, outwardly radiating therefrom cells of the model with a corresponding, different type of radiation. In such an example, the types of radiation can be specified as different colors. Such an example can include rendering, to a display, the different colors as radiated from their corresponding sides of the plurality of faults. As an example, a method can include generating at least one cell that includes different types of radiation.

As an example, a model can include three-dimensional cells. As an example, sectors can include three-dimensional sectors (see, e.g., FIG. 11). As an example, a compartment can be a three-dimensional compartment.

As an example, a system can include a processor; memory operatively coupled to the processor; and processor-executable instructions stored in the memory to instruct the system to: access a model of a subterranean region where the model includes a fault that corresponds to a fault in the subterranean region; via a first side of the fault, outwardly radiate therefrom cells of the model with a first type of radiation and, via a second, opposing side of the fault, outwardly radiate therefrom cells of the model with a second type of radiation; and, based at least in part on the outwardly radiation of the first type of radiation and the outwardly radiation of the second type of radiation, assign a portion of the cells of the model a sidedness property value with respect to the fault that indicates that each cell in the portion of the cells is assigned to the first side of the fault or assigned to the second side of the fault. In such an example, processor-executable instructions can be included to instruct the system to render a graphical user interface to a display where the graphical user interface includes different colors that correspond to different types of radiation.

As an example, one or more computer-readable storage media can include computer-executable instructions to instruct a computer, the instructions including instructions to: access a model of a subterranean region where the model includes a fault that corresponds to a fault in the subterranean region; via a first side of the fault, outwardly radiate therefrom cells of the model with a first type of radiation and, via a second, opposing side of the fault, outwardly radiate therefrom cells of the model with a second type of radiation; and, based at least in part on the outwardly radiation of the first type of radiation and the outwardly radiation of the second type of radiation, assign a portion of the cells of the model a sidedness property value with respect to the fault that indicates that each cell in the portion of the cells is assigned to the first side of the fault or assigned to the second side of the fault.

As an example, one or more of the example method can include or be associated with various computer-readable media (CRM) blocks. Such blocks generally include instructions suitable for execution by one or more processors (or processor cores) to instruct a computing device or system to perform one or more actions. While various blocks are shown, a single medium may be configured with instructions to allow for, at least in part, performance of various actions of one or more methods. As an example, a computer-readable medium (CRM) may be a computer-readable storage medium that is non-transitory and that is not a carrier wave.

As an example, a workflow may be associated with various computer-readable media (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium. As an example, blocks may be provided as one or more sets of instructions, for example, such as the one or more sets of instructions 270 of the system 250 of FIG. 2, etc.

Figure 14:
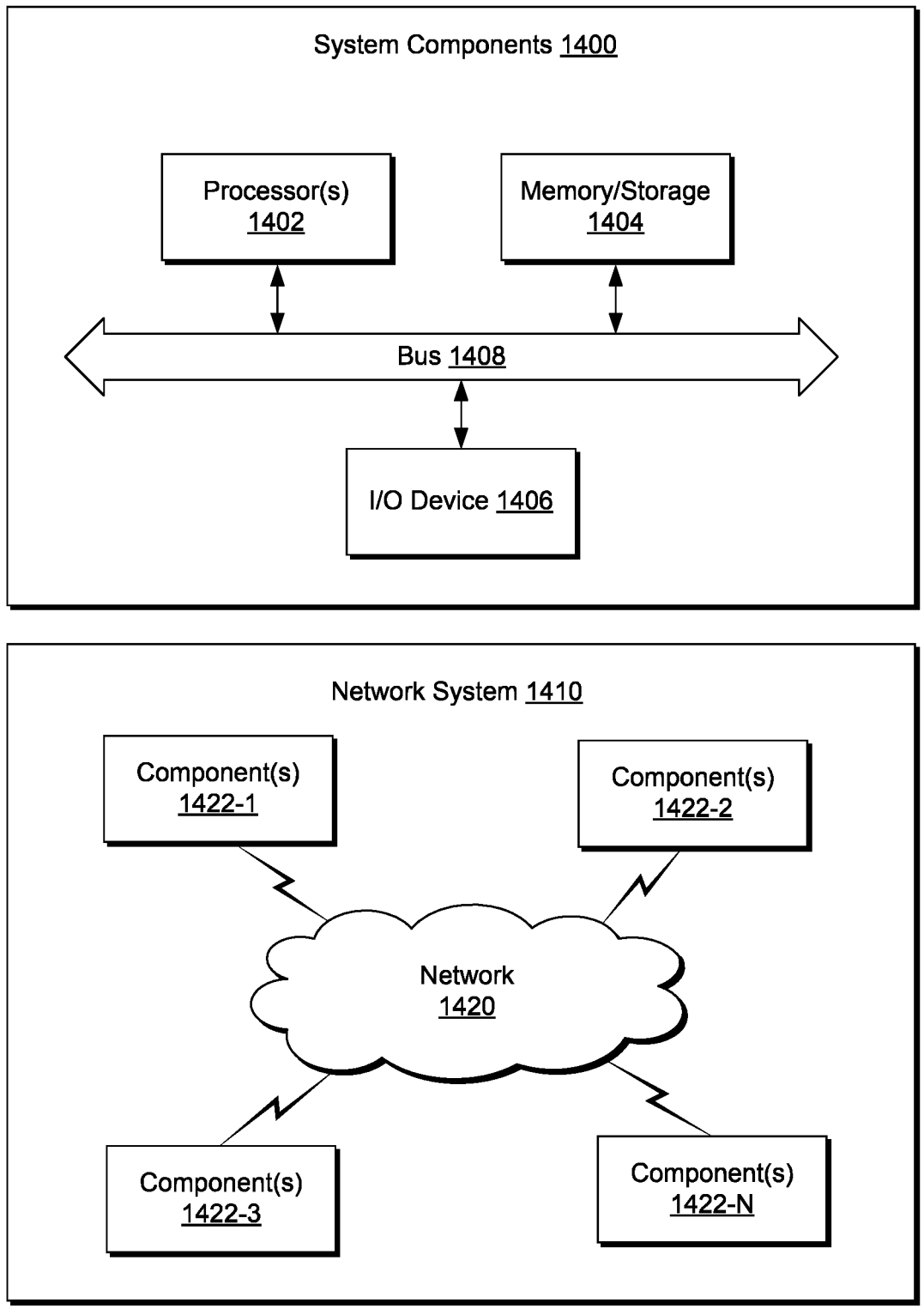
FIG. 14 illustrates example components of a system and a networked system.

FIG. 14 shows components of an example of a computing system 1400 and an example of a networked system 1410. The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1422-2 may include an I/O device for display and optionally interaction with a method. The network 1420 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   accessing a model of a subterranean region wherein the model comprises a fault that corresponds to a fault in the subterranean region;
   via a first side of the fault, outwardly radiating therefrom cells of the model with a first type of radiation configured to illuminate the first side of the fault with a first set of illumination values and, via a second, opposing side of the fault, outwardly radiating therefrom cells of the model with a second type of radiation configured to illuminate the second, opposing side of the fault with a second set of illumination values, wherein the first type of radiation and the second type of radiation are generated from a radiation source in the model; and
   based at least in part on the outwardly radiating of the first type of radiation and the outwardly radiating of the second type of radiation, assigning a portion of the cells of the model a sidedness property value with respect to the fault that indicates that each cell in the portion of the cells is assigned to the first side of the fault or assigned to the second, opposing side of the fault.

2. The method of claim 1 comprising splitting the model into sectors wherein each of the sectors comprises a portion of the cells and wherein the portion of the cells assigned a sidedness property value is one of the sectors.

3. The method of claim 1 comprising for a number of assigned sidedness property values for a corresponding number of the cells, assigning at least one compartment property value.

4. The method of claim 3 wherein each of the at least one compartment property value comprises an identifier that is a member of a group of sequential identifiers for corresponding spatially defined compartments within the model.

5. The method of claim 3 comprising detecting at least one truncation of the fault by another fault wherein assigning the at least one compartment property value is based at least in part on the detecting.

6. The method of claim 5 wherein one side of the fault is assigned at least two compartment property values based at least in part on a detected truncation of the fault by another fault.

7. The method of claim 1 comprising identifying a first sector composed of a portion of the cells that comprises a predominant sidedness property value wherein the predominant sidedness property value differs from that of a second sector composed of a different portion of the cells wherein at least some of the cells of the first sector and the second sector are adjacent cells.

8. The method of claim 7 comprising performing radiation calculations on each of the cells in the first sector to assign a sidedness property value to each of the cells.

9. The method of claim 1 comprising performing tiered assigning wherein one tier assigns cells sidedness property values on a cell sector basis and wherein another tier assigns cells sidedness property values based on an individual cell basis.

10. The method of claim 1 wherein the first type of radiation and the second type of radiation decay with respect to distance from the fault.

11. The method of claim 1 comprising rendering, to a display, the first type of radiation in a first color and the second type of radiation in a second color.

12. The method of claim 1 wherein the model comprises a plurality of faults and comprising, for each of the plurality of faults, via a first side of an individual fault, outwardly radiating therefrom cells of the model with a corresponding type of radiation and, via a second, opposing side of the individual fault, outwardly radiating therefrom cells of the model with a corresponding, different type of radiation.

13. The method of claim 12 wherein the types of radiation are specified as different colors.

14. The method of claim 13 comprising rendering, to a display, the different colors as radiated from their corresponding sides of the plurality of faults.

15. The method of claim 12 wherein at least one cell comprises different types of radiation.

16. The method of claim 1 wherein the cells comprise three-dimensional cells.

17. The method of claim 2 wherein the sectors comprise three-dimensional sectors.

18. A system comprising:
a processor;
memory operatively coupled to the processor; and
processor-executable instructions stored in the memory to instruct the system to:
  access a model of a subterranean region wherein the model comprises a fault that corresponds to a fault in the subterranean region;
  via a first side of the fault, outwardly radiate therefrom cells of the model with a first type of radiation configured to illuminate the first side of the fault with a first set of illumination values and, via a second, opposing side of the fault, outwardly radiate therefrom cells of the model with a second type of radiation configured to illuminate the second, opposing side of the fault with a second set of illumination values, wherein the first type of radiation and the second type of radiation are generated from a radiation source in the model; and
  based at least in part on the outwardly radiation of the first type of radiation and the outwardly radiation of the second type of radiation, assign a portion of the cells of the model a sidedness property value with respect to the fault that indicates that each cell in the portion of the cells is assigned to the first side of the fault or assigned to the second, opposing side of the fault.

19. The system of claim 18 comprising processor-executable instructions to instruct the system to render a graphical user interface to a display wherein the graphical user interface comprises different colors that correspond to different types of radiation.

20. One or more non-transitory computer-readable storage media comprising computer-executable instructions to instruct a computer, the instructions comprising instructions to:
  access a model of a subterranean region wherein the model comprises a fault that corresponds to a fault in the subterranean region;
  via a first side of the fault, outwardly radiate therefrom cells of the model with a first type of radiation configured to illuminate the first side of the fault with a first set of illumination values and, via a second, opposing side of the fault, outwardly radiate therefrom cells of the model with a second type of radiation configured to illuminate the second, opposing side of the fault with a second set of illumination values, wherein the first type of radiation and the second type of radiation are generated from a radiation source in the model; and
  based at least in part on the outwardly radiation of the first type of radiation and the outwardly radiation of the second type of radiation, assign a portion of the cells of the model a sidedness property value with respect to the fault that indicates that each cell in the portion of the cells is assigned to the first side of the fault or assigned to the second, opposing side of the fault.

* * * * *